United States Patent
Archibald et al.

[11] Patent Number: 5,825,883
[45] Date of Patent: Oct. 20, 1998

[54] METHOD AND APPARATUS THAT ACCOUNTS FOR USAGE OF DIGITAL APPLICATIONS

[75] Inventors: William Charles Archibald; Terence Paul Spielman; Jason Spielman, all of Austin, Tex.

[73] Assignee: Interval Systems, Inc., Austin, Tex.

[21] Appl. No.: 551,124

[22] Filed: Oct. 31, 1995

[51] Int. Cl.[6] .................................................. H04L 9/00
[52] U.S. Cl. .................. 380/25; 380/4; 380/23; 380/24; 380/49; 380/50; 705/1; 705/30
[58] Field of Search ...................... 380/4, 23, 24, 380/25, 49, 50, 59; 705/1, 26, 30, 34, 401, 412, 500

[56] References Cited

U.S. PATENT DOCUMENTS

| | | |
|---|---|---|
| 4,528,643 | 7/1985 | Freeny, Jr. . |
| 4,827,508 | 5/1989 | Shear .......................................... 380/4 |
| 4,977,594 | 12/1990 | Shear .......................................... 380/4 |
| 5,050,213 | 9/1991 | Shear .......................................... 380/25 |
| 5,410,598 | 4/1995 | Shear .......................................... 380/4 |

OTHER PUBLICATIONS

"Patents on selling via the Net—really?" *IEEE Micro*, pp. 6–7, 74–75, Oct. 1996.

*Primary Examiner*—Bernarr E. Gregory
*Attorney, Agent, or Firm*—Jenkens & Gilchrist; Michele A. Mobley

[57] ABSTRACT

A method and apparatus that accounts for utilization of digital applications on an as used basis is accomplished by compensating a publisher for each use of its digital application instead of a lump sum purchase price. This is done by embedding a tariff file within the digital application where a digital application may be a software application, a video file, a text file, and/or an image file. The embedded tariff file, which includes a digital application identification code and a publisher identification code, is used by a meter module to generate accounting information. The accounting message is routed to a collection agency which, in turn, generates debiting information for the user and crediting information for the publishers of the digital application.

110 Claims, 17 Drawing Sheets

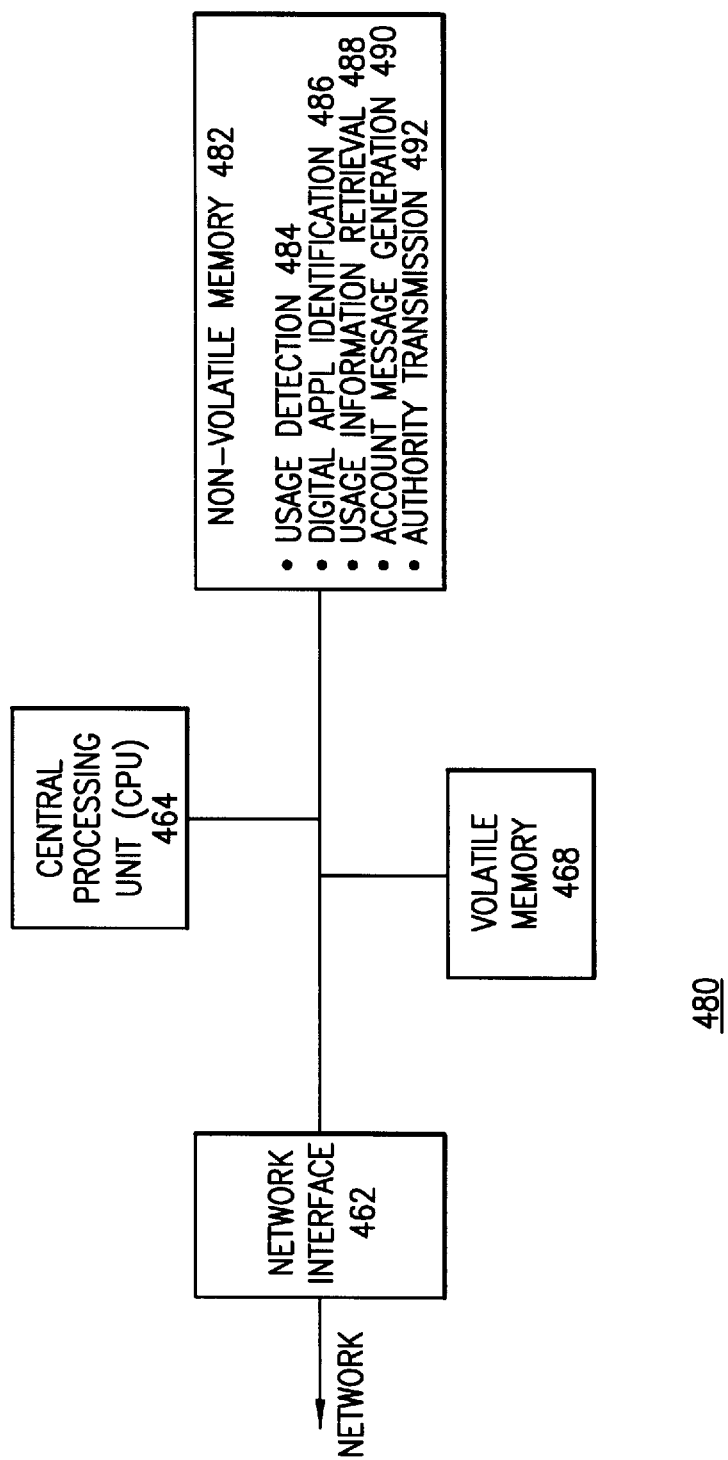

METHOD AND APPARATUS THAT ACCOUNTS FOR USAGE OF DIGITAL APPLICATIONS

TECHNICAL FIELD OF THE INVENTION

This invention relates generally to software distribution and usage and, more particularly, to accounting for usage of software.

BACKGROUND OF THE INVENTION

With the development of the personal computer (PC) in the late 1970s and early 1980s, the computer industry has dramatically changed. Prior to the development of the PC, the computer industry was primarily a hardware dominated industry in which only businesses were consumers. For example, mainframe computers dominated the computer market. Such computers were typically housed within a room(s) of the business and accessed by limited personnel.

While the mainframe computer still has many applications, the PC has changed the computer marketplace to all types of businesses and to the general public. In many businesses, each employee has a computer on his/her desk linked together via a local area network (LAN) such that the employees may efficiently share data. In addition to being coupled locally via the LAN, the computers may be connected to a wide area network (WAN) and/or the Internet. Such networking allows a user of a computer to share data with any other computer in the world. The same is true for an individual who has a home computer coupled to a network.

In addition to broadening the computer marketplace, the PC has changed the computer industry from being completely dominated by hardware manufactures to being as dominated, if not more, by software manufacturers. This software domination is reflected in the thousands of companies that now produce software applications and is also reflected by the multi-billion-dollar revenues that are generated from the sales of such software applications. With the growth of the software industry, piracy of software has equally grown, which is reflected in that software pirates robbed software manufacturers of approximately $10 billion in 1993. Such pirates range from sophisticated hackers to friends almost innocently sharing software. In general, a software pirate is a person who has obtained a copy of a software application in an unauthorized manner, i.e., the person did not obtain the software through authorized distribution channels.

Currently, piracy of software is an unfortunate by-product of the software itself. As is known, a software manufacture produces the software as a series of digitally stored instructions stored on a disk. The disk is then distributed to the end user directly, through a distribution chain, or a value added reseller. Upon obtaining the disk, a user loads the software on to his/her computer. This loading involves copying the software application from the disk to memory of the computer, which can be accomplished within a few seconds. This ease of copying exposes software to piracy.

To combat piracy, several techniques have been developed to verify authenticity of a software copy, i.e., insure that the software was obtained through an authorized distribution chain. One approach is called "dongles" which requires a computer executing the software to have an affiliated hardware key. When the software program is invoked, an initialization process of the software checks for the hardware key. If the hardware key is present, the initialization process of the software allows the computer to execute the programming instructions. If, however, the hardware key is not attached or is not the appropriate hardware key, the initialization process of the software prevents execution of the programming instructions.

A second piracy reducing technique is called a "software floating license manager", which is used in conjunction with LANs. Such floating license managers allow one or more software applications to be shared by affiliated computers of the LAN. This approach works on a first-come, first-serve basis wherein, when a first user accesses the shared software, that user obtains the license for it and blocks other users from using that copy. When the user is finished, the floating license is released and another affiliated computer of the LAN may use the software.

Another piracy reducing technique utilizes a hardware meter that is enclosed in a tamper-proof silicon form factor embedded within a computer system. In such a system, prior to executing the software, the hardware meter is addressed and subsequently determines whether the computer system has an authentic copy of the software application. If not, the hardware meter prevents execution of the software.

Yet another piracy reducing technique involves packaging several software applications on a compact disk (CD). When a user loads the CD onto his/her computer, a display screen is presented depicting the software applications available on the CD. The user then determines which application he/she wishes to utilize and then obtains a code from the vendor for each software application. When the code is obtained, the user may access the particular software applications.

While each of these techniques works to some degree to limit piracy, they all focus on controlling distribution of the software. While control of distribution of products works well for tangible goods such as computers, power supplies, other mechanical type devices or consumable type devices, it has proved to have limited success for software.

Piracy is not only a problem for software manufacturers, it is also a problem for any manufacturers that produces a digital application. A digital application may be an active application or a passive application, where an active application manipulates data, such as a software program, while a passive application may be a data file. In addition, a digital application may be any information that can be stored digitally, such as video files, image files, text files, etc.

Therefore, a need exists for a method and apparatus that substantially eliminates the problems of piracy by de-emphasizing control of distribution and focusing on use of a digital application, such as a software application.

BRIEF DESCRIPTION OF THE DRAWINGS

FIG. 19 illustrates a computer that includes embedded digital application accounting software in accordance with the present invention.

DETAILED DESCRIPTION OF A PREFERRED EMBODIMENT

Generally, the present invention provides a method and apparatus that accounts for usage of digital applications. Such a method and apparatus is not concerned with the distribution channels in which a digital application is obtained, but monitors when the digital application is invoked for usage. At this time, the method and apparatus of the present invention begin to generate accounting information for this particular usage of the digital application. As the usage continues, the accounting information accrues, and when the use of the digital application is completed, the accrued accounting information is routed to an authority. The authority then determines debiting information for the user and crediting information for the legal distributor of the digital application, i.e., the publisher. Thus, by switching the focus of compensation for distribution sales to compensation based on use, the present method and apparatus renders the manner in which software is obtained irrelevant, including obtaining the software via piracy. As a result, software manufacturers are able to recapture a substantial portion of the $10 billion lost annually due to software piracy.

Figure 1:
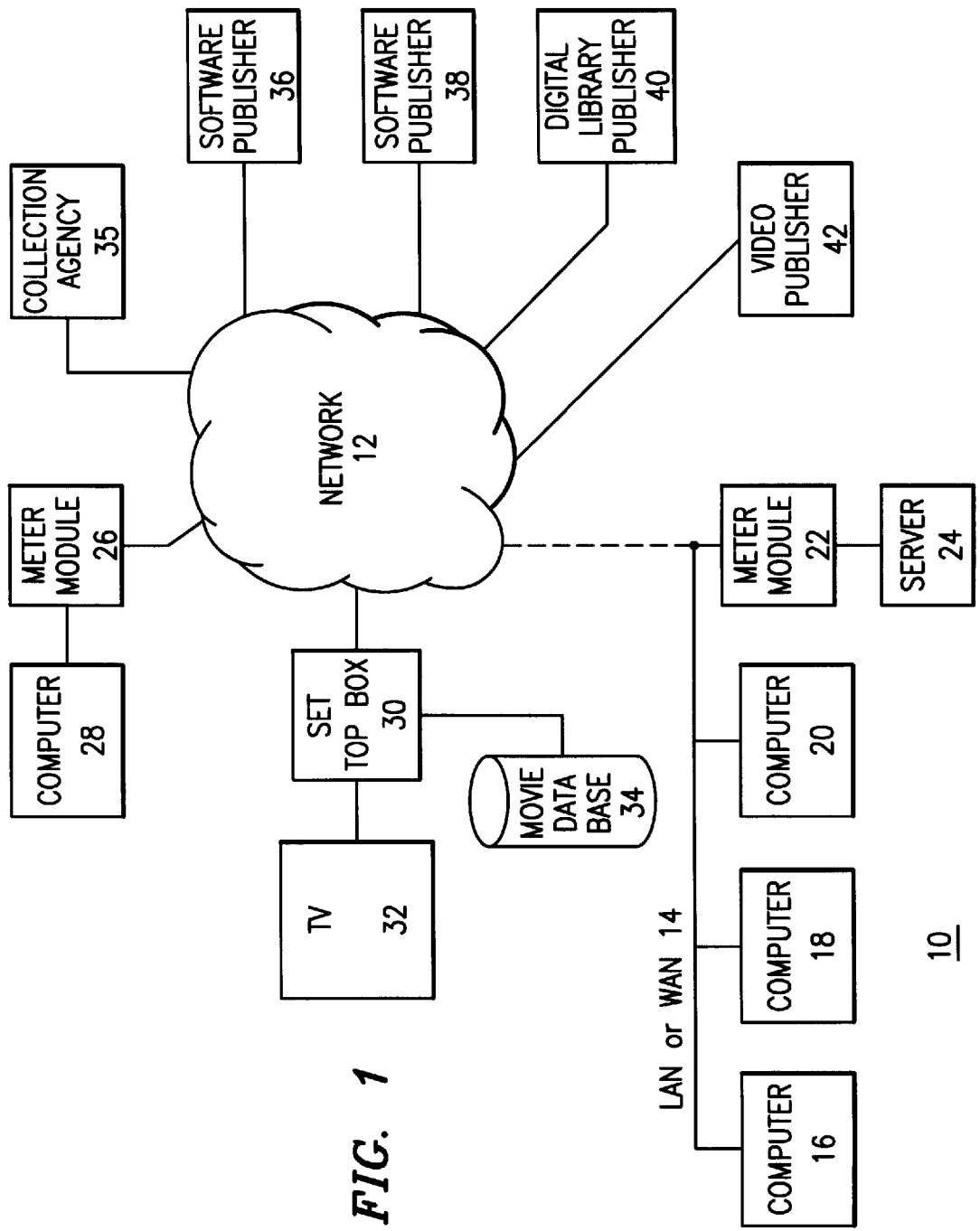
FIG. 1 illustrates a schematic block diagram of a communication network in which the present invention may be incorporated.

FIG. 1 illustrates a communication system 10 that includes a network 12 that is coupled to a local area network (LAN) or wide area network (WAN) 14, a set top box 30, a meter module 26, a collection agency 35, software publishers 36–38, a digital library publisher 40, and a video publisher 42. The network 12 may be any available network that couples digital devices—such as computers, television sets, telephones, facsimile machines, etc.—together. For example, the network 12 may be the Internet, public telephone switch network (PTSN), satellite network, or any other type of networking medium.

In essence, the communication system 10 has three basic components: (1) consumers, (2) digital application providers, and (3) digital application use monitor. The consumers are entities that will use a digital application, wherein each consumer is affiliated with a meter module 22, 26, or embedded meter module software. Such consumers may be a computer 28, a television set 32, a LAN or WAN 14, a telephone (not shown), a facsimile machine (not shown), or any other type of electronic equipment that may use active or passive digital applications. The computer 28, which is coupled to meter module 26, may be any type of digital processor; for example, the computer 28 may be a personal computer, a workstation, or a handheld personal computing device. The television set 32, which is coupled to a set top box 30 that includes meter module functionality, may be a video monitor for displaying text, graphical images, video movies, etc. The television set 32 may also be operably coupled a movie database 34 that stores digitized video images, such as movies.

The digital application providers are entities that supply the digital applications for the consumers' use. Such digital application providers are shown as the software publishers 36, 38, digital library publisher 38, and video publisher 42. The software publisher 36, 38 provide active digital applications such as software applications, wherein the software applications may be original works of the software publisher 36, 38 or compilations of several software applications. Such software applications include account overhead instructions (discussed below with reference to FIG. 2) and may be made available to the consumers in a variety of ways. For example, the consumer may obtain a copy of a software application via the network, from a value adder reseller, or even in a manner that, in the prior art, would be considered piracy.

The digital library publisher 40 provides passive digital applications such as text files. Such text files may be representative of books, magazines, newspapers, etc. As with the software publishers 36, 38, the digital library publisher 40 can make its digital applications available to the consumer via any number of distribution channels.

The video publisher 42 provides passive digital applications such as digitized video files. The digitized video files may be representative of movies, pictures, graphic images, etc. Like the other types of publishers, the video publisher 42 can make its digital application available to consumers via any number of distribution channels. As one skilled in the art will readily appreciate, the software publishers 36, 38, the digital library publisher 40, and the video publisher 42 do not have to be separate entities and one publisher may produce software, text files, and digitized video files.

The third basic component of the communication system 10 is the digital application use monitor, or authority. The digital application use monitor collects account information from a meter module affiliated with a consumer and digital application information from the publishers to generate debiting information for the consumer and crediting information for the publisher(s). The digital application use monitor may be a collection agency 35 or within one of the publishers 36–42. One skilled in the art will readily appreciate that a digital application monitor provides a service to the publishers and may do so for any number of publishers regardless of whether it is a separate entity or part of a publisher. A more detailed discussion of the digital application use monitoring function will be presented below with reference to FIGS. 3, 4, and 13.

The LAN or the WAN 14, which includes a plurality of computers 16–20, a meter module 22, and a server 24, is connected to the network 12 via a dotted line. The connection is depicted in this manner to illustrate that the LAN or WAN 14 may function separately, i.e., as its own network, or as a consumer of the communication system 10. As a consumer of the communication system 10, the server 24, or any of the computers 16–20, may obtain a copy of a digital application. The meter module 22 tracks the usage of the digital application and provides the account information to the collection agency 35. Note that as a consumer, the LAN or WAN 14 does not have to share the digital application, as was the case in the software floating license manager. Using the present invention, each computer 16–20 of the LAN or WAN 14 may simultaneously access a digital application.

When the LAN or WAN 14 is not coupled to the communication system 10, it can function as its own network employing the teachings of the present invention. In this configuration, the server 24 can act as a repository of usage information, and when connected to the network 12, forwards the usage information to the appropriate collection agency. Alternatively, the server 24 may function as both the authority (i.e., the digital application use monitor) and publisher.

As an example of the server 24 functioning as both the authority and publisher, assume that the LAN or WAN 14 is a closed system for a business having many departments, where one department functions as a digital application supplier (publisher) to the other departments (consumers). The publisher department places a digital application and on the server, which is accessed by the consumer departments. In such a case, the server 24 obtains account information from the meter module 22 and digital application information from the publisher department. As the information is received, the server 24 generates debiting information for the appropriate consumer departments and crediting information for the publisher department.

The communication system 10 insures that publishers are appropriately compensated for use of their digital applications regardless of how a consumer (LAN or WAN 14, computer 28, or TV 32) obtained a copy. The communication system 10 does this via the meter modules 22, 26 and the collection agency 35. The meter modules 22, 26 provide account information (which identifies the digital application, the publisher, the user, and the amount of use) to the collection agency 35, which based on digital application information (identifies the cost of use) determines debiting information and crediting information. The collection agency 35 then debits the user, or consumer, and credits the publisher. By focusing digital application compensation on use, or consumption, instead of distribution sales, the communication system 10 substantially eliminates the problems presented by software piracy, thereby allowing digital application manufactures to recapture a substantial portion of the monies lost to piracy.

Figure 2:
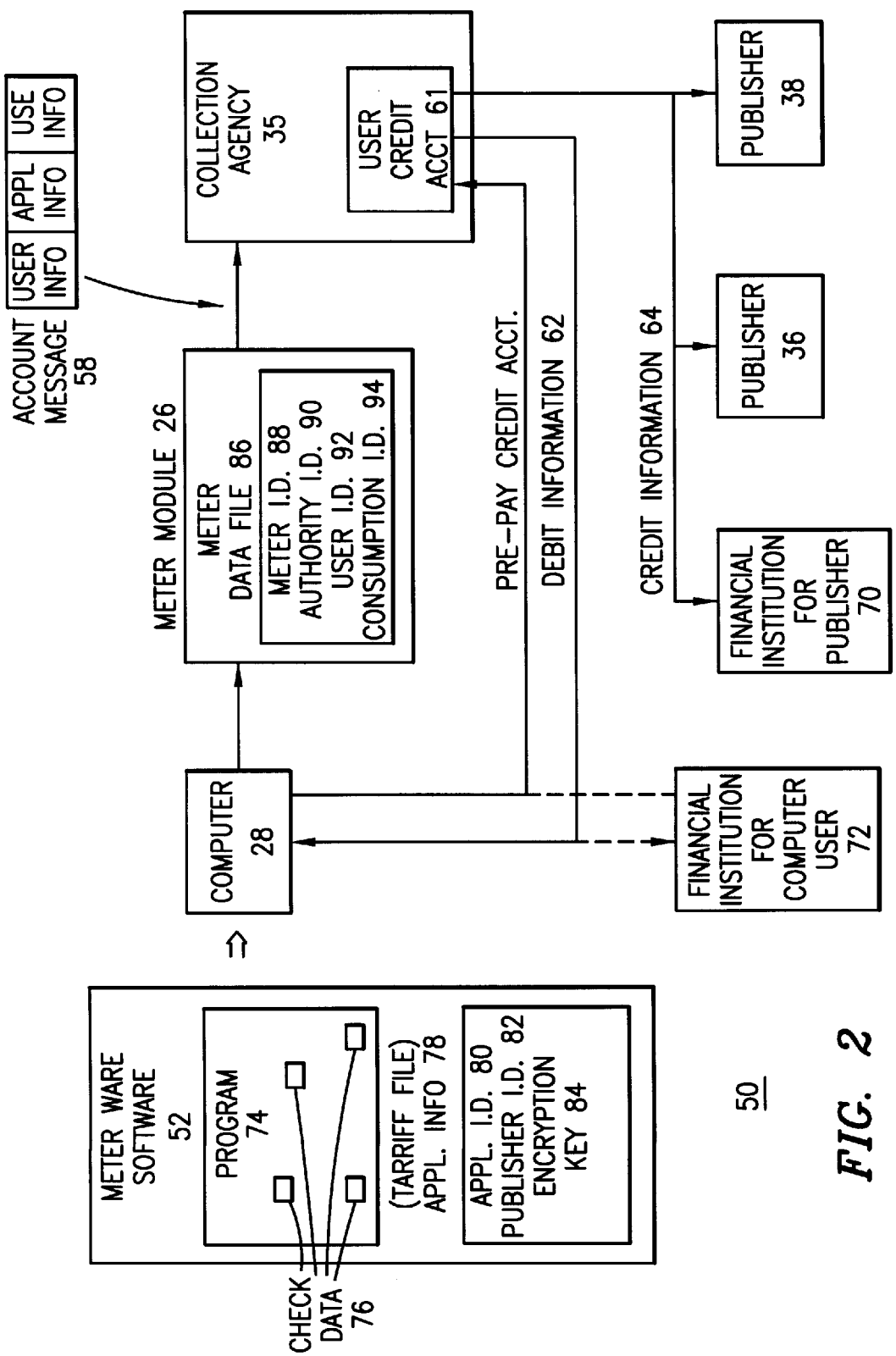
FIG. 2 illustrates a schematic block diagram of payment distribution in accordance with the present invention.

FIG. 2 illustrates a schematic block diagram that illustrates several methods for distributing credit information and debit information. The example shown is for a computer that obtains a copy of a software application 52, however, the example is equally applicable to other types of digital applications and their usage. As shown, the communication system portion 50 includes the computer 28, the meter module 26, the collection agency 35, the software publishers 36–38, a financial institution for the publisher 70, and a financial institution for the computer user 72.

The software application 52 includes a program section 74 and an application information section, or tariff file, 78. The program section includes the program instructions of the software application and embedded check data 76. The embedded check data 76 is utilized by the meter module 26 to insure that during operation, the program 74 is being executed as the publisher had intended. If the utilization of the program deviates from the intended use, the use of the program is terminated. There are several techniques of using embedded check data into a software application to insure proper execution. Such techniques include the known cycle redundancy check (CRC), random number hopping, jump instruction tables, and response time predictions. Each of the latter three techniques will described in greater detail below with reference to FIG. 9.

The tariff file, or application information, 78 includes a digital application identification code (application ID) 80, a publisher identification code 82, and an encryption key 84. The application ID 80 is used to identify this particular digital application. For this example, assume that the digital application is rev. 5.1 of a word processing software application. Thus, the application ID 80 identifies the software as word processing 5.1. The publisher identification code (publisher ID) 82 identifies the particular publisher of this software application. Note that the publisher ID 82 may identify multiple publishers and may also identify distributors, value adder resellers, or any other entity authorized to distribute the digital application. The encryption key 84 is used when the particular digital application is encrypted or the tariff file is encrypted.

To enhance security of the overall system, it is recommended that the program 74 be encrypted utilizing the encryption key 84. The meter module 26 will then assist in the decryption process such that the program 74 may be utilized by the computer 28.

When the computer 28 invokes, or initializes, the program 74, the application information 78 is sent to the meter module 26 which includes a meter data file 86. The meter data file 86 stores a meter identification code 88, an authority identification code (authority ID) 90, a user identification code (user ID) 92, and a consumption identification code 94. The meter identification code 88 is used to identify this particular meter module 26. The authority ID 90 is used to affiliate the publisher ID 82 with a particular authority. When the authority is the actual publisher, this will be reflected in this entry of the meter data file 86. The user ID 92 identifies the computer 28 and may also identify a user account number for the computer 28. The consumption identification code 94 is used to identify this particular usage of the software application 52.

Having obtained the application information 78 from the computer 28 and accessing the meter data file 86, the meter module 26 generates usage information, or an accounting message, 58. In general, the accounting message 58 will include the user information, i.e., the user ID 80, or user account number; application information, i.e., the application ID 80, the publisher ID 82, and the authority ID 90; and use information, i.e., length of use. The accounting message 58 is then routed to the collection agency 35 which, in turn, generates debiting information 62 and credit information 64. The debiting information is routed to the computer 28 or the financial institution for the computer user 72.

If the debiting information 62 is routed to the computer 28, the operator of the computer 28 must somehow make a payment based on the debiting information. As one skilled in the art will readily appreciate, payment of a particular bill may be done in a variety of ways, such as by mailing in a check, using a credit card account, or instructing the collection agency to debit a particular financial account of the user.

If the user of the computer 28 has established that payment for digital applications is to be done by debiting the user's account within a financial institution, the debiting information will be routed to the financial institution 72. When this is done, the account will be debited for the actual amount of use.

The crediting information 64 may be routed to one or both of the publishers 36–38 or to a financial institution for the publisher 70. The collection agency 35 determines which publisher, or publishers, are to be credited from the account message. Having made this determination, the collection agency routes the crediting information to the publisher or the financial institution for the publisher 70. Note that instead of the collection agency 35 functioning as the authority, one of the publishers may function as the authority. Further note that the authority may collect the credit information in a real time manner and then distribute payment to the appropriate publishers at timed intervals, such as once a week, once a month, etc.

As an alternative to routing the debiting information 62 to the computer 28 or the financial institution 72, the collection agency 35 may establish a user credit account 61 for the particular computer 28. In this situation, the user of the computer 28 prepays the credit account 61. When the computer utilizes a software application, the collection agency 35 simply debits the user credit account 61 and credits the appropriate publisher(s). Thus, as mentioned above, regardless of how the computer 28 obtains the software 52, the appropriate publisher(s) of the software 52 will be compensated based on the usage of the software as opposed to distribution sale.

Figure 3:
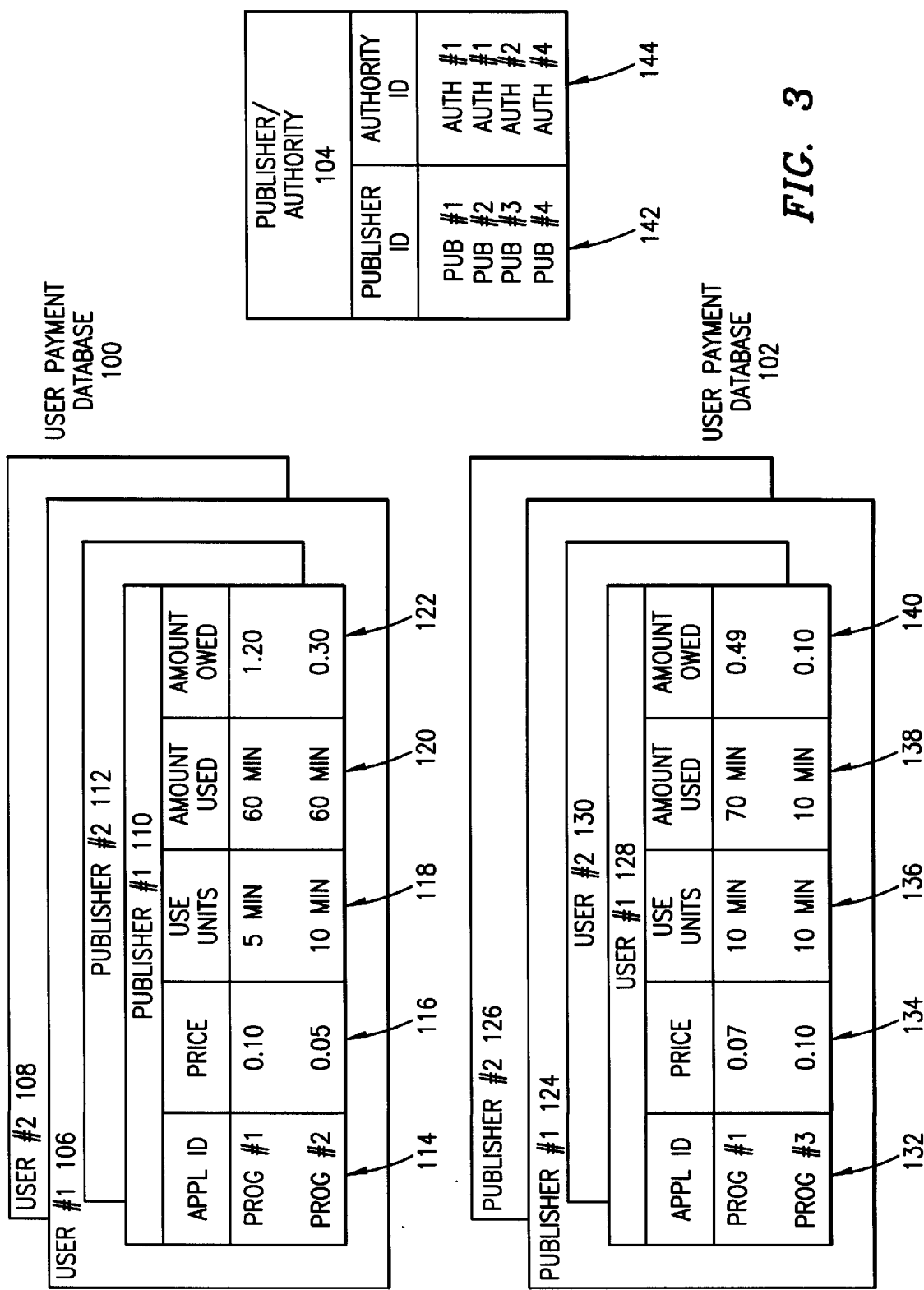
FIG. 3 illustrates user payment databases in accordance with the present invention.

FIG. 3 illustrates user payment databases 100, 102 that may be incorporated within the collection agency 35 and a publisher/authority database 104 that may be incorporated within the meter module 22, 26. The user payment database 100 is based on user records 106, 108, while user payment database 102 is based on publisher records 124, 126. One skilled in the art will readily appreciate that either database 100 or 102 may be stored within the collection agency and the other database generated therefrom.

The user payment database 100 includes a plurality of records for users 106–108. Within each user record 106–108 is a plurality of publisher records 110–112. Within each publisher record 110–112 is an application identification field 114, a price field 116, a use unit field 118, an amount used field 120, and an amount owed field 122. In one embodiment, the collection agency 35 receives the accounting message 58 in a real time fashion and updates the amount used and the amount owed fields accordingly. In another embodiment, the collection agency 35 receives the accounting message 58 after the user has terminated use of the software application.

The examples shown for User Record #1 106 includes two publisher records #1 and #2. Within publisher record #1 110, the user has acquired two programs (programs 1 and 2) published by publisher #1. Publisher #1 has established that, for this user, Program 1 costs 10 cents per unit of use wherein the unit of use is 5 minutes. Publisher #1 has also established that, for this user, Program 2 will cost 5 for unit of use which is 10 minutes. For a particular user, user 1 utilized program 1 for 60 minutes, thus, the amount owed is $1.20. User 1 also used program 2 for 60 minutes and acquired a debiting amount of 30 cents. The collection agency 35 uses the amount owed field to generate the debiting information, which is sent to the computer 28, and crediting information, which is sent to publisher 1. For this example, the debiting and crediting information is $1.50.

The user payment database 102 is generated based on publisher records 124–126. Within each publisher record is a plurality of user records 128–130. Each user record 128–130 includes an application identification field 132, a price field 134, a use unit field 136, an amount used field 138, and an amount owed field 140. As with the publisher record 110, the use field 128 is obtained in a similar manner. It should be apparent to one skilled in the art that the user payment database 100 or 102 may be used as depicted in FIG. 3 or generated in a different manner.

The publisher authority database 104 includes a publisher field 142 and an authority field 144. As shown, the publisher field 142 equates a particular publisher with an authority of the authority field 144. Thus, authority 1 services publishers 1 and 2 while authority 2 services publisher 3, and publisher 4 acts as its own authority. Thus, when the meter module 26 generates an accounting message for use of an digital application published by publisher 4, the message identifies publisher 4 as the authority. Thus, the accounting message will be sent to publisher #4 which is acting as its own collection agency. Conversely, when the meter module 28 generates an accounting message for use of a digital application produced by either publishers 1, 2 or 3, the accounting message is sent to the corresponding authority.

While the description of the databases of FIG. 3 were described as being incorporated within the collection agency and meter module, it should be noted that they may be distributed anywhere throughout the communication system network 10. For example, the user payment database 100 may be stored at the individual user's computer wherein the computer obtains pricing information from the publisher. Similarly, the user payment data base 102 and the publisher/authority data base 104 may be stored by a publisher. Alternatively, all databases 100–104 may be stored at the meter module. Regardless of where the databases are stored, they provide the pricing information which is used to generate the debiting information and crediting information.

The databases illustrate in FIG. 3 illustrate usage based on time and time increments. Alternatively, usage, or consumption, may be based on any one or a combination of several different use criterion, such as time, time increments, functionality, resource, number of accesses or invocations, amount of database access, etc. Consumption based on functionality may be based on the amount of time or the number of accesses of particular portions or algorithms within the application. Consumption based on resource tracks the number of cycles of a primary component of a computer system during execution of the digital application, such as the system's CPU (central processing unit) or main memory. Consumption may also be based on the number of times the application is invoked or how often it accesses a particular database, where such database may be located within the digital application or accessed remotely. An one or a combination of several of these criterion may be used depending upon the type of digital application that is being executed.

Figure 4:
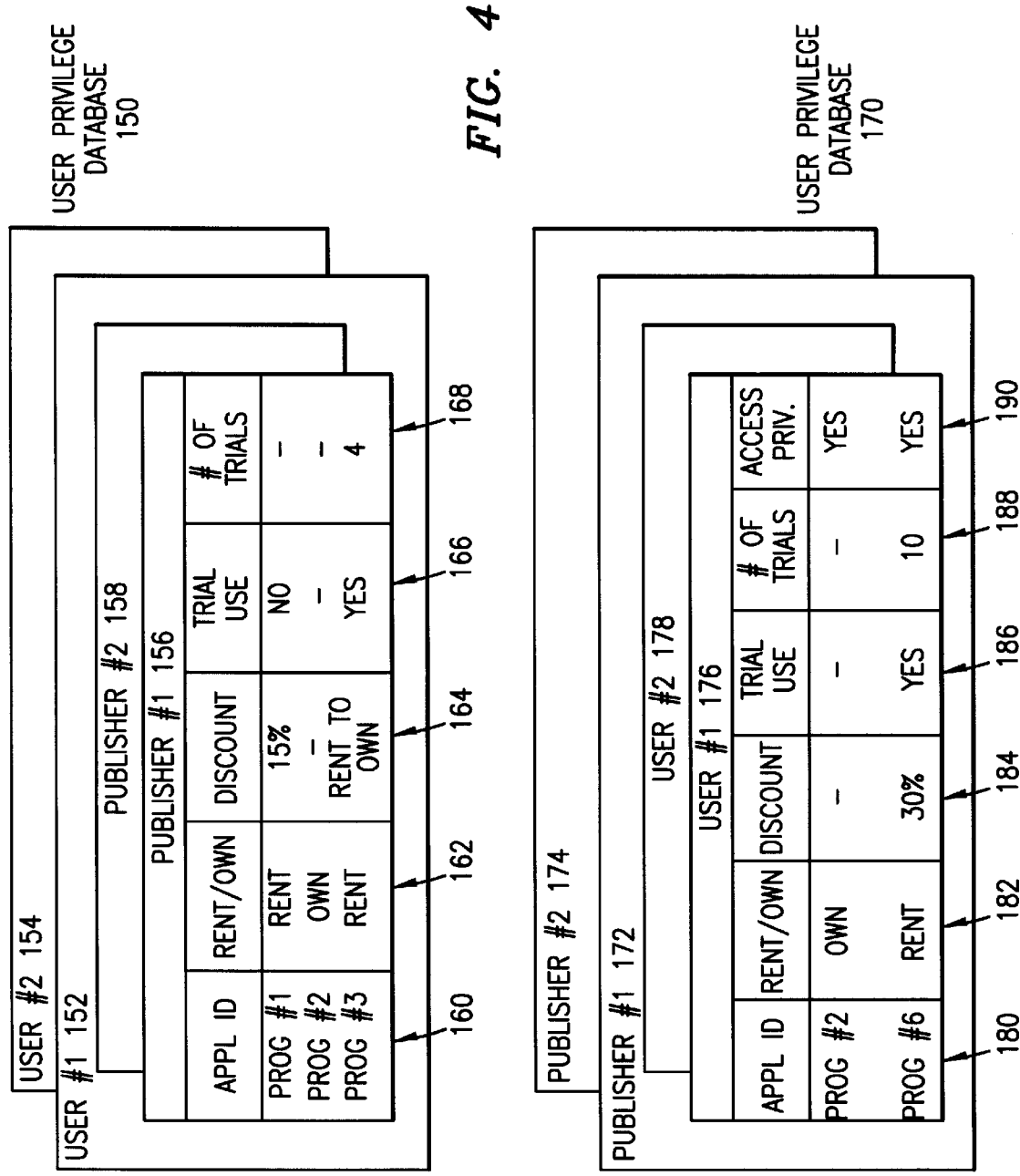
FIG. 4 illustrates user privilege databases in accordance with the present invention.

FIG. 4 illustrates additional databases that may be contained within the collection agency and used to determine the debiting and crediting information. These databases are shown as user privilege databases 150 and 170, wherein both databases store essentially the same information, but in different record orientations. The user privilege database 150 contains a plurality of user records 150–154. Within each user record is a plurality of publisher records 156–158. Each publisher record 156–158 includes an application identification field 160, a rent or own field 162, a discount field 164, a trial use field 166, and a number of trials field 168. The application identification field 160 identifies the particular digital application being used by this particular user. The rent or own field 162 indicates whether the user has purchased the software application or is renting the software application. It is conceived that a purchaser may still go to a software distribution warehouse and purchase a disk copy and associated manuals. Therefore, such a user would be considered an owner of the software. Alternatively, if the user obtains the digital application via the Internet or some other means, such as from a friend, the user is considered to be renting the software or digital application. This information is reflected in the rent or own field 162.

The discount field 164 indicates whether the publisher is providing a particular discount to the user or whether the user is in the process of renting to own the particular software application. The discount information is used by the collection agency in conjunction with the user payment database 100 or 102 to generate the actual debiting and crediting information. If the user is in the process of renting to own the particular software, the collection agency monitors the accrued amount of use and the amount owed and compares it with a purchase price. When the user debits accrues to the purchase price, the rent to own field switches to own such that the user no longer pays for access of this particular software application.

The trial use field 166 indicates whether the publisher is allowing this particular user to use the digital application on a trial use basis. If the publisher has granted the user trial use, this is reflected as a yes such that the collection agency does not debit the user nor credit the publisher for such use. The number of trials used field 168 indicates how many times the user may access this particular digital application without paying for it. The number of trials used may be a particular amount of time or number of accesses.

The user privilege database 170 includes a plurality of publisher records 172–174. Within each publisher record 172–174 is a plurality of user records 176–178. Each user record 176–178 includes an application identification field 180, a rent or own 182, a discount field 184, a trial use 186, number of trials field 188, and access privilege field 190. The application field 180, the rent or own field 182, the discount field 184, the trial use field 186, and the number of trials field 188 are similar to the fields in the user database 150.

The access privilege field 190, which may also be incorporated in the user privilege database 150, indicates whether the publisher is allowing a particular user access to a particular digital application. The publisher may wish to restrict access to a particular digital application when such an application contains confidential information or is in the process of being beta site tested. For example, if the network is within a corporation, the corporation may wish to restrict access to particular digital applications (for example, employment record files) to particular employees. Thus, the access privilege field 190 would indicate which particular employees could have access to those particular digital applications.

As with the databases of FIG. 3, the user privilege databases 150 and 170 may be contained within the user system computer, the meter module, the publishers, the authority (i.e., the collection agency), or distributed among any of these entities. Regardless of where the particular databases are stored, the publishers provide the information for the databases. Generation of the databases of FIG. 3 and FIG. 4 will be discussed below with reference to FIGS. 16 and 17.

Figure 5:
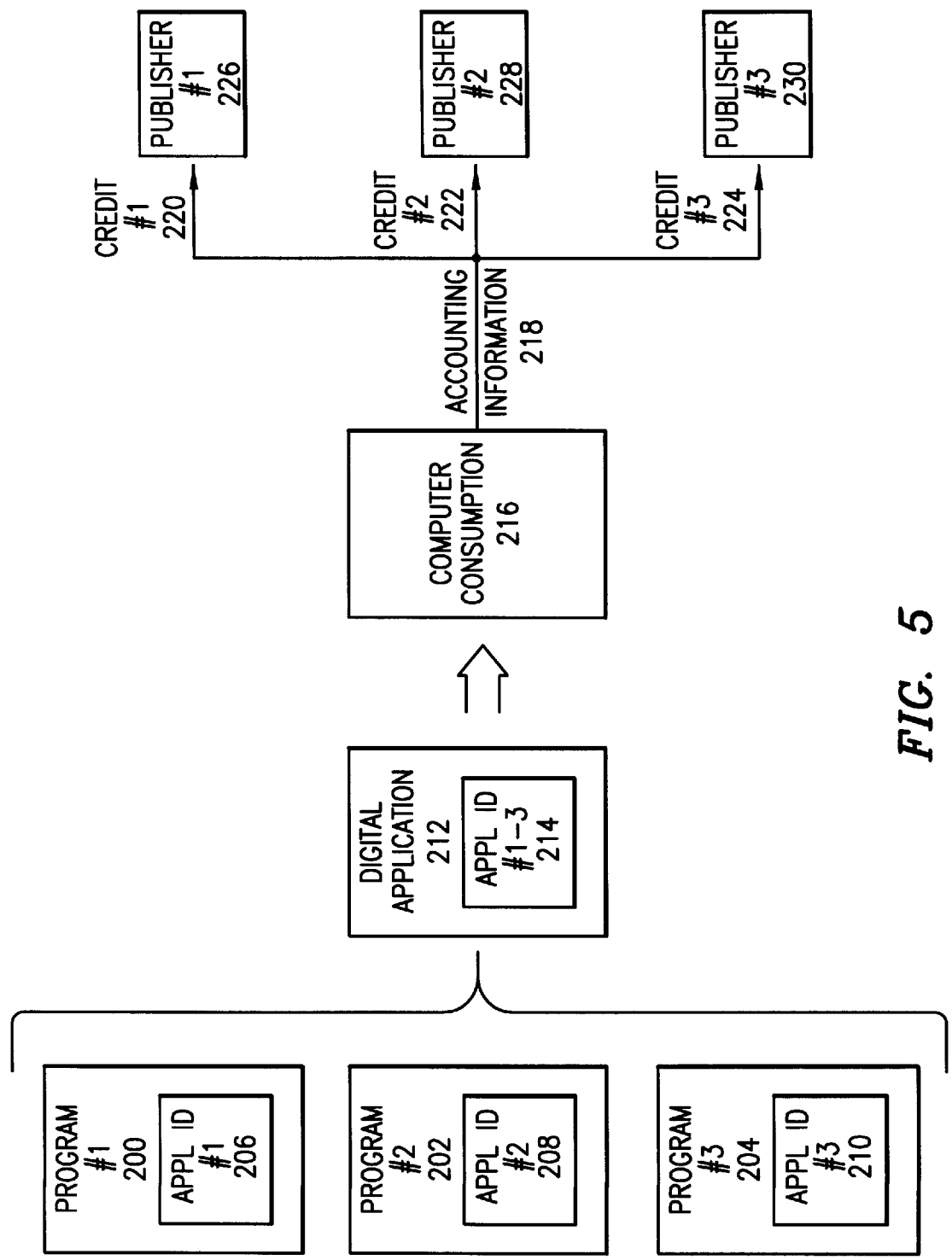
FIG. 5 illustrates an exemplary payment distribution of multi-programs in accordance with the present invention.

FIG. 5 illustrates an example of multiple programs 200–204 being combined into one digital application 212 and payment distribution therefor. The example shown in FIG. 5 assumes that a collection agency exists as well as the infrastructure support shown in FIGS. 1 and 2. As shown, programs 1–3 200–204 each include an application identification field 206–210. A particular software vendor (i.e., publisher) may combine programs 1, 2 and 3 into a digital application 212. Within the digital application 212, the vendor will include an application identification field 214. The application identification field 214 will identify programs 1, 2 and 3 as well as any individual contributions the vendor added.

Unlike prior art software generation practices, the present invention allows such program combinations to be done with limited licensing rights or no licensing rights. In the past, for the vendor to generate the digital application 212, the vendor would need a license from the vendors of program 1–3. The license would have to include the rights to compile, to make a derivative work, to distribute, and to make subsequent copies. Such a license would assure that the vendors of programs 1–3 would be compensated for the use of their applications. The present invention reduces the need for licenses by assuring that each vendor will be properly compensated for the use of their respective applications via the application identification field 214. When the computer consumes, or uses, the digital application 212, an associated meter module generates accounting information 218 for this particular use. The accounting information identifies each of the vendors, the user, and the particular applications being used; such applications being the programs 200–204 developed by each vendor and the newly created digital application 212.

The accounting information 218 is routed to a collection agency, or authority, which generates credit information for each of the particular vendors, or publishers, of the software. As shown, the credit information is produced as three pieces of information: credit #1 220, credit #2 222, and credit #3 224. The pieces of credit information 220–224 are simultaneously routed to their respective publishers 226–230. The individual credits are generated as described above with reference to FIGS. 1 and 4. From a publisher's perspective, it is almost irrelevant that its application is combined with another application, since the accounting information provides separate compensation for each application.

From the example of FIG. 5, it should be readily apparent to one skilled in the art that a plurality of computer programs may be used to generate new programs and that the present invention provides a means in which each publisher is appropriately compensated. Proper accounting will occur regardless of how the programs were obtained, even via "piracy", provided that the programs include an application identification record. Thus, the accounting principles of the present invention substantially reduce the need for strict licensing terms between digital application vendors, or publishers.

Figure 6:
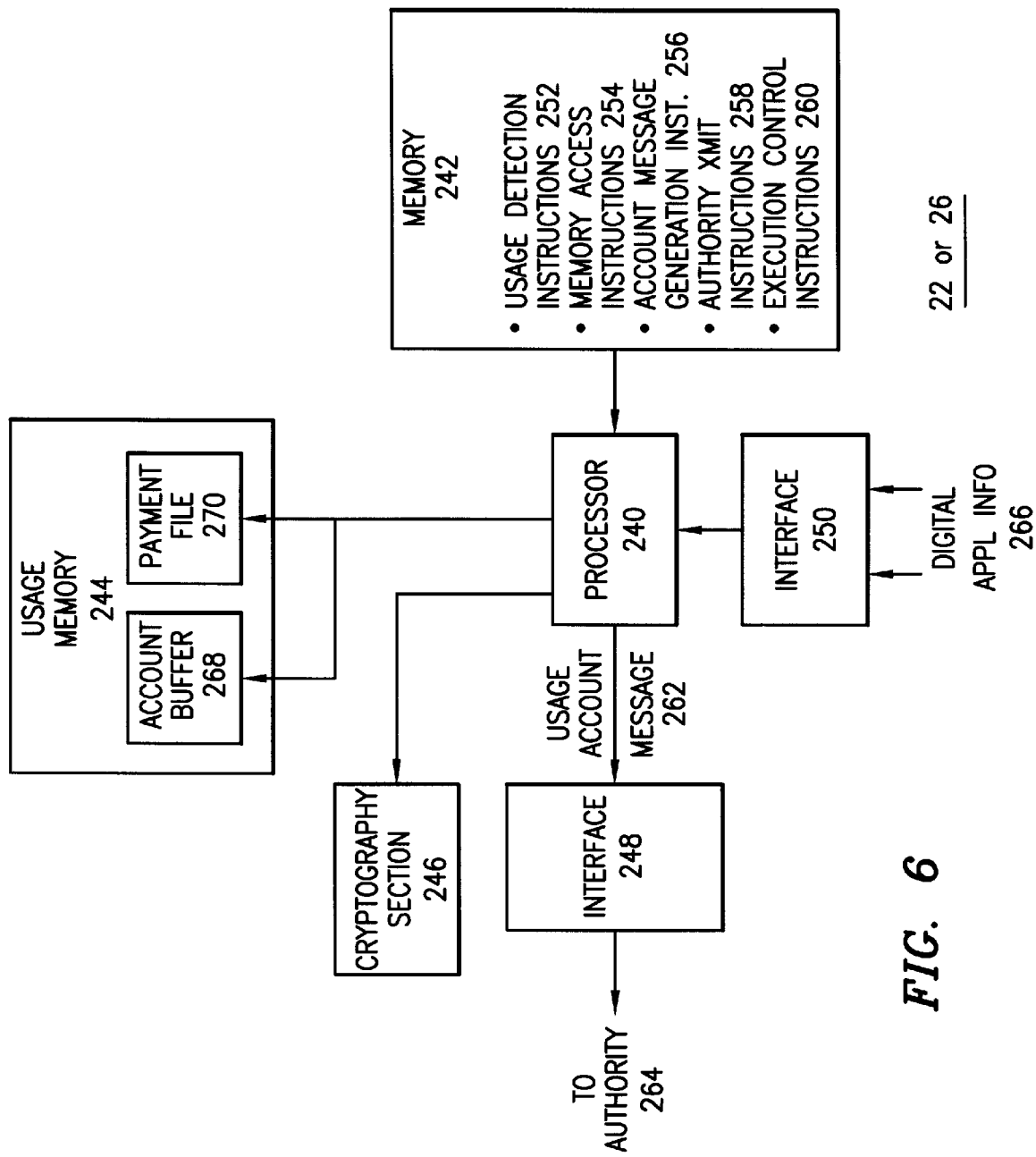
FIG. 6 illustrates a schematic block diagram of a meter module in accordance with the present invention.

FIG. 6 illustrates a schematic block diagram of the meter module 22 or 26. As shown, the meter module 22 or 26 includes a processor 240, memory 242, usage memory 244, a cryptography section 246, a network interface 248, and a computer interface 250. The processor 240 may be a microprocessor, digital signal processor, microcontroller, or any other processing devices that is capable of performing the program instructions stored in memory 242 and manipulating the data stored in the usage memory 244.

The programming instructions stored in memory 242 include usage detection instructions 252, memory access instructions 254, account methods generation instructions 256, authority transmit instructions 258, and execution control instructions 260. A detailed discussion of each of these programming instructions will be presented below with reference to FIGS. 7–11.

In general, the processor 240 receives digital application information 266 (i.e., the digital application ID, the publisher ID, and, if applicable, an encryption key) via interface 250. The processor 240 processes the digital application information along with information stored in usage memory 244 to generate the usage account message 262, which is subsequently routed to an authority 264 via an interface 248. The information stored in the usage memory 244 includes a user ID, a meter module ID, authority ID, and a consumption ID which may be stored in an account buffer 268. The usage memory 244 may also include a payment file 270 which would include similar information to that described in the databases of FIG. 3 and may also contain a payment history for each user.

As previously mentioned, the digital application and digital application information 266 may be encrypted. In such a case, the cryptographic section 246 decrypts, using the encryption key, the information such that the processor may perform its functions. It should be readily apparent to one skilled in the art that the cryptography section 246 may be an integral part within the processor 240 or incorporated in any other known manner.

Figure 7:
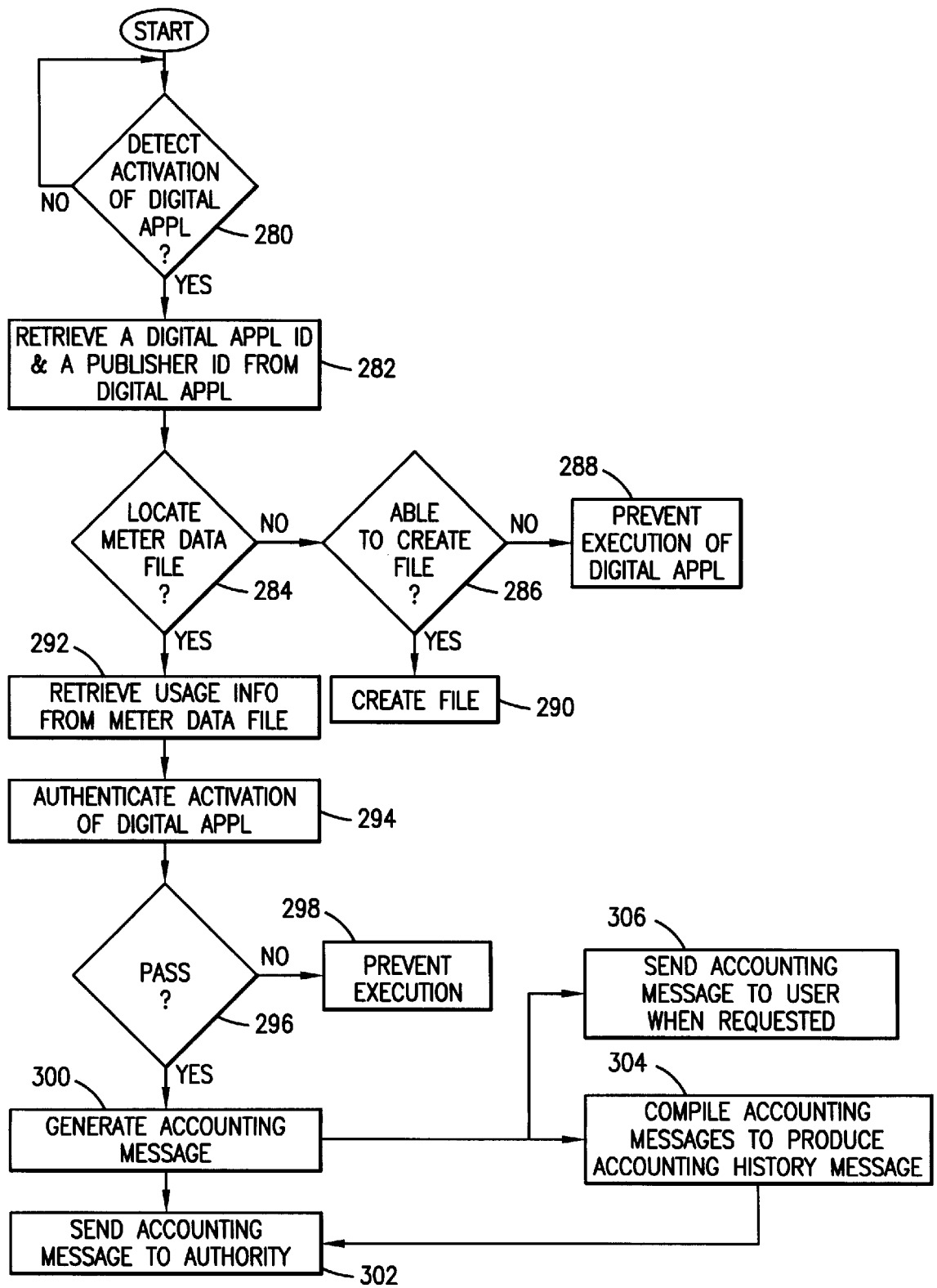
FIG. 7 illustrates a logic diagram that may be used to implement the present invention.

FIG. 7 illustrates a logic diagram that may be used by the meter module 26 of FIG. 6 to perform an aspect of the present invention. The process begins at step 280 where the meter module determines whether it has detected activation of a digital application. If not, the process waits until a digital application is invoked. For the purposes of this application, a digital application may be, but is not limited to, a software application, a multimedia application such as a text file, image file, or video file, or a telecommunication application such as a particular feature of a cellular telephone or land mobile communication system. The meter module detects when a digital application is activated when the user of a user system requests the particular digital application from a server or initiates a run command for the digital application.

Having detected activation of a digital application, the process proceeds to step 282 wherein the meter module retrieves a digital application identification code and a publisher identification code from the digital application. As previously mentioned, software generated to be used within the context of the present invention should have an embedded tariff file which includes the digital application ID and a publisher application ID. Also note that this information may be decrypted to further enhance security of the system.

Having retrieved the identification codes for the digital application and the publisher, the process proceeds to step 284. At step 284, the meter module determines whether a meter data file exists for this particular user. If not, the process proceeds to step 286 where the meter module determines whether it can create such a file. If not, the process proceeds to step 288 where the meter module prevents execution of the digital application. The meter module may not be able to create a meter data file for the particular user, because, for example, the privilege access field of the privilege database may indicate that this particular user cannot access this particular digital application. If, on the other hand, the meter module can create the file, the process proceeds to step 290 where the file is created. Details of the creation of a meter data file will be discussed in greater detail below with reference to FIG. 16.

When the meter data file is located, or has been created, the process proceeds to step 292 where the meter module retrieves usage information from the meter data file. The usage information, as mentioned above, may include the authority identification code, the user identification code, the user crediting account information, and a consumption ID. Having obtained this information, the process proceeds to step 294 where the meter module authenticates activation of the digital application. The authentication process will be described in more detail with reference to FIG. 8.

At step 296, the meter module determines whether the authentication process of step 284 has been successful. If not, the process proceeds to step 298 wherein the meter module prevents execution of this particular digital application. If, on the other hand, the authentication process is successful, the process proceeds to step 300 wherein the meter module generates an accounting message. As mentioned with respect to FIG. 2, the accounting message includes user information, application information, and use information. Such information enables the collection agency to determine how much to debit the user and how much to credit the particular publisher or publishers.

Having generated the accounting message, the process proceeds in one of three directions. The process may proceed to step 302 wherein the accounting message is routed to an authority identified within the meter module. As mentioned above, an authority may represent several publishers, wherein the authority handles the day to day accounting of digital application usage for each publisher and, on a periodic basis, provides such information to the publishers.

Another path that the process may proceed is to jump to step 304 wherein the accounting messages are compiled to produce an accounting history message. In this step, for a particular user, the meter module may accumulate the accounting information for a predetermined period of time. For example, the predetermined time may be a day such that for a given day, the meter module determines the overall use by the user for a digital application and at the end of the day generates the accounting history message which is sent to the authority at step 302.

Yet an alternative path that may be taken from step 300 is to proceed to step 306. At step 306, the meter module sends the accounting message to the user when the user has requested such information. This step allows the user to monitor his/her usage or a particular digital application or a plurality of digital applications. It also allows the user to determine how much credit is left in his/her user credit account and how much money is owed to particular publishers.

Figure 8:
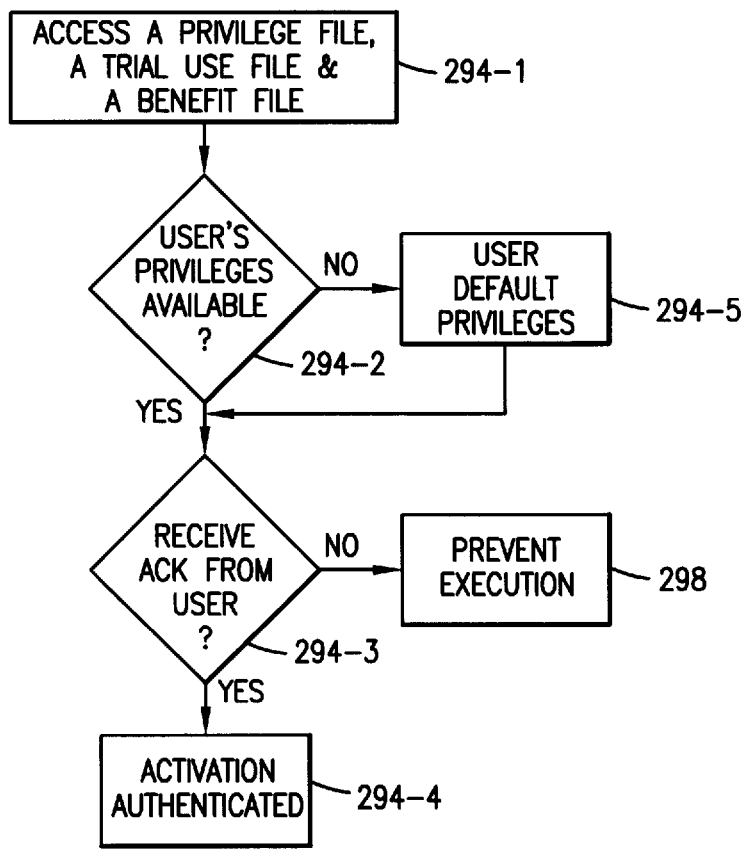
FIG. 8 illustrates a logic diagram that more fully describes the authentication process of FIG. 7.

FIG. 8 illustrates a logic diagram that further describes the authentication process of step 294 of FIG. 7. At step 294-1, a privilege file, a trial use file, and a benefit file are accessed to determine privileges for a particular user. As discussed with reference to the databases of FIG. 4, a particular publisher may establish particular use privileges for a particular user. Such privileges may include a rate discount, rent to own, trial use, or special access privileges for beta site testing of software applications, or access to restricted files.

Having accessed the particular files, the process proceeds to step 294-2 wherein the process determines whether privileges exist for the particular user. If the user privileges are not available, the process proceeds to step 294-5 wherein the user system is assigned default privileges. Default privileges are general terms which the publisher allows for all users. For example, for a particular digital application, the price is fixed at a certain rate, there will be no discount, it will be assumed that the user is renting the information without the option to buy, and the user will be restricted from any type of special privileged access to beta site testing of digital applications or restricted files.

Having retrieved the privileges or assigning default privileges, the process proceeds to step 294-3 wherein the process determines whether an acknowledgment has been received by the user. In most applications, the system will provide a message to the user to inform the user of the particular digital application that has been selected, the rates at which it can be utilized, and whether the particular user wishes to proceed in accessing the digital application. If the user decides not to access the digital information based on the displayed information, the user will respond negatively or not provide an acknowledgment signal. If this condition occurs, the process proceeds to step 298 wherein execution of the digital application is prevented. If, however, the user responds with an acknowledgment signal, the process proceeds to step 294-4 wherein activation of the process has been authenticated.

Figure 9:
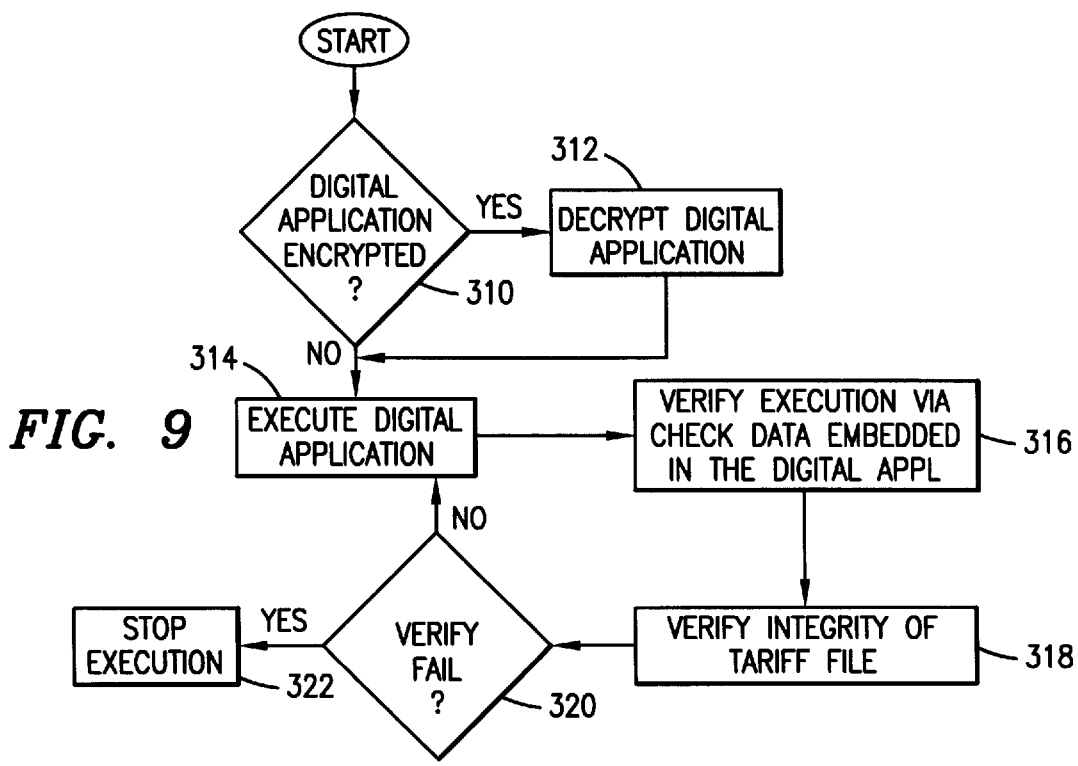
FIG. 9 illustrates a logic diagram that may be used for encryption/decryption of a digital application in accordance with the present invention.

FIG. 9 illustrates a logic diagram that may be used to verify, or authenticate, the use of a digital application throughout the use of the digital application. The process begins at step 310 where it is determined whether the digital application is encrypted. If the digital application is encrypted, the process proceeds to step 312 where the digital application is decrypted. Step 312 may also include a decision block that if the digital application cannot be decrypted, for example, for not having the appropriate encryption key, the digital application will not be decrypted and thus will not be executed.

If the digital application is not encrypted or has been decrypted, the process proceeds to step 314 wherein the digital application is executed. During the execution of the digital application, the process repeatedly utilizes step 316 to verify, via check bits embedded in the digital application, the proper execution of the digital application. As mentioned above, the check data are embedded throughout the digital application by the publisher of the digital application. The check bits are used to verify the proper execution of the software application. For example, the check bits may be related to a cycle redundancy check (CRC) wherein the CRC is periodically executed throughout the usage of the digital application. One skilled in the art will readily appreciate that a number of other verification techniques may be used via the check data to insure proper execution of the digital application.

In addition to verifying execution of the digital application, the process also verifies at step 318 that the tariff file has not been altered, i.e., the digital application identification code and the publisher identification code have not been altered. The process then proceeds to step 320 where it determines whether either step 316 or 318 failed. If neither step failed, the process repeats at step 314 until the user terminates the use of the digital application. If, however, one of the verification processes of step 316 or 318 fails, the process proceeds to step 322 wherein execution of the digital application is stopped.

Figure 10:
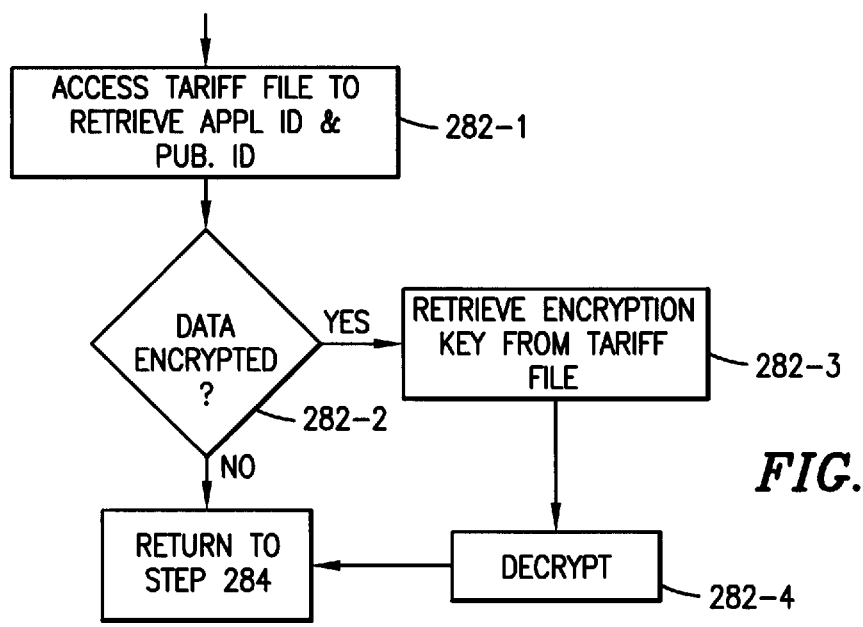
FIG. 10 illustrates a logic diagram that more fully describes the retrieval of digital application information of FIG. 7.

FIG. 10 illustrates a logic diagram that depicts the retrieving step 282 of FIG. 7 in more detail. At step 282-1, a tariff file is accessed to retrieve an application identification code and a publisher identification code. As previously mentioned, the tariff file is embedded as part of the software or digital application. The process then proceeds to step 282-2 where it is determined whether the tariff file is encrypted. If so, the process proceeds to step 282-3 wherein an encryption key is retrieved from the tariff file. The process then proceeds to step 282-4 wherein the tariff file is decrypted using the encryption key. Having decrypted the file, or when the file is not encrypted, the process returns to step 284.

Figure 11:
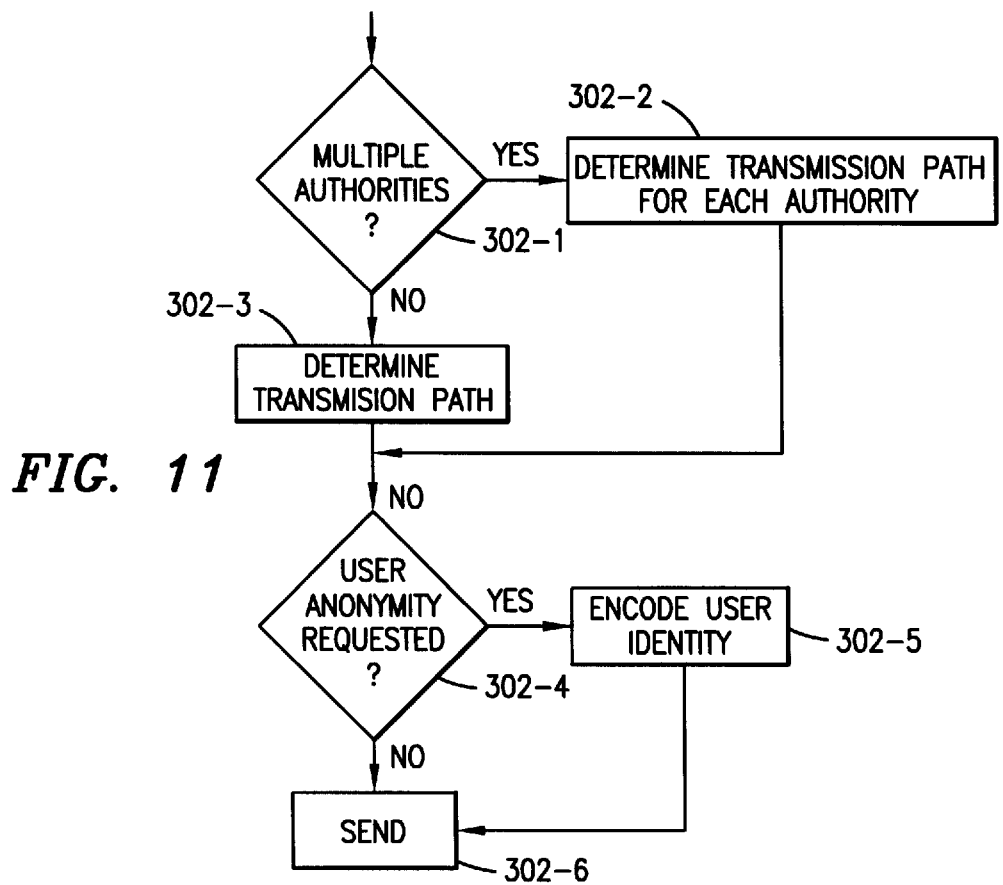
FIG. 11 illustrates a logic diagram that more fully describes the sending of an accounting message to an authority of FIG. 7.

FIG. 11 illustrates a logic diagram which more fully describes the sending step 302 of FIG. 7. At step 302-1, the process determines whether the accounting message identifies multiple authorities. If so, the process proceeds to step 302-2 where it determines transmission paths for each authority. The determination of a transmission path may be in any number of manners. For example, the transmission path may be to route the information via the Internet to the particular authority, it may be to hand carry a disk to the particular authority, mail the disk to the particular authority, use electronic mail to route the accounting information, or any other means in which digital information can be conveyed from one entity to another.

If there is only a single authority, the process proceeds to step 302-3 where it determines a transmission path to the single authority. The process then proceeds to step 302-4 where it determines whether the user has requested anonymity. If not, the process proceeds to step 302-6 where the accounting information is routed to the authority or authorities identified. If, however, the user has requested anonymity, the process proceeds to step 302-5. At this step, the user's identity is encoded in any number of ways. For example, the user identity may be encrypted, related to an alias, or altered in another manner. Having encoded the user identity, the process proceeds to step 302-6 wherein the accounting information is routed to the authority or authorities identified.

Figure 12:
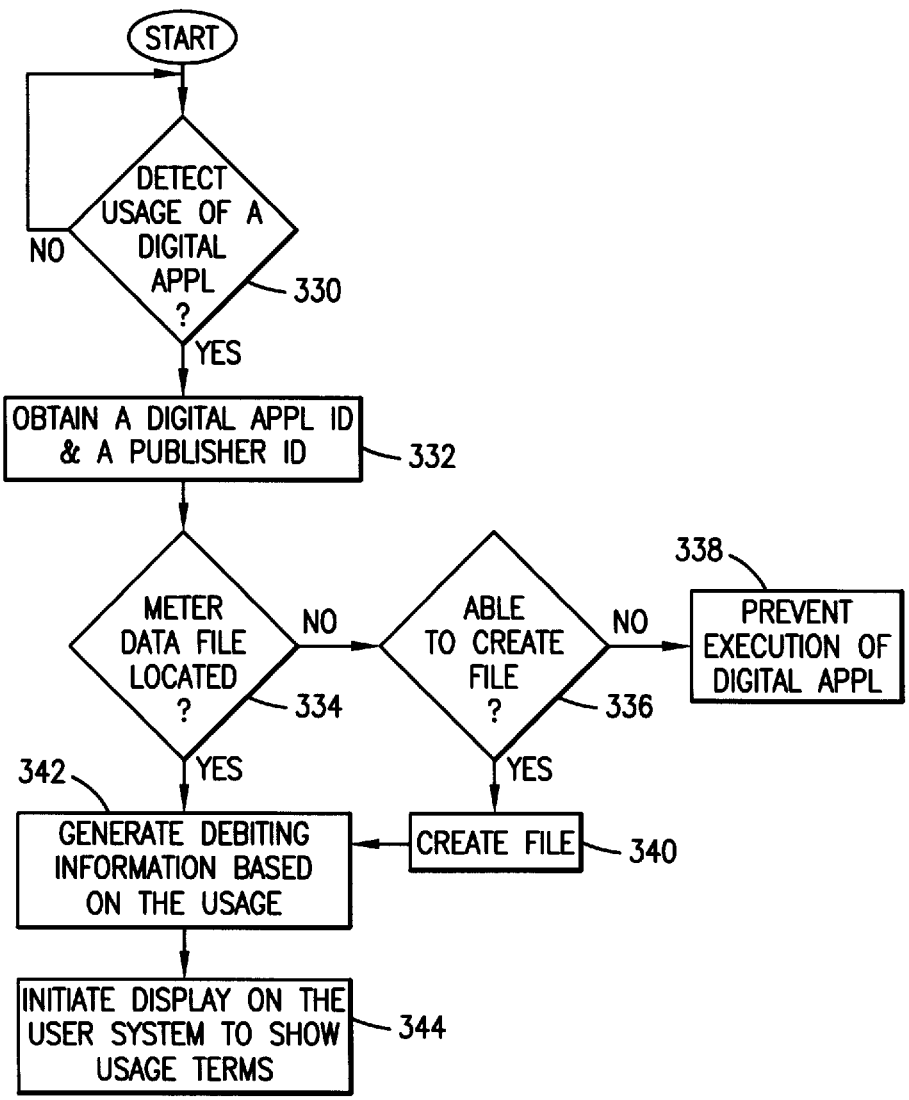
FIG. 12 illustrates a logic diagram that depicts the steps for generating debiting information based on usage of a digital application.

FIG. 12 illustrates a logic diagram that may be used to generate debiting information in accordance with the present invention. As previously mentioned, debiting information may be generated by a collection agency, the user, a publisher, or a meter module. Regardless of which entity is performing the function, the process begins at step 330 wherein the process determines whether it has detected usage of a digital application. As previously mentioned, an entity may detect when a digital application is activated by determining when it has been requested or when it has been initialized, or when the information in the tariff file has been routed to the meter module.

Once usage of a digital application has been detected, the process proceeds to step 332 wherein the process obtains a digital application identification code and a publisher identification code from the particular digital application. As mentioned above, digital applications, which may be software, video, text files, image files, etc., include a tariff file which includes at least a digital application identification code and a publisher identification code.

Having retrieved the digital application identification code and publisher identification code, the process proceeds to step 334 where it is determined whether a meter data file exists for this particular user. If not, the process proceeds to step 336 where it is determined whether the meter data file can be created. If not, the process proceeds to step 338 where the process prevents execution of the digital application. If, however, the file can be created, the process proceeds to step 340 wherein the file is created. As previously mentioned, a detailed discussion of the creation of a meter data file will be presented below with reference to FIG. 16.

Having created the meter data file or having located the meter data file, the process proceeds to step 342 in which debiting information is generated based on usage of the digital application. As previously mentioned, the debiting information will be based on the amount of use of the particular digital application by the user, the pricing set by the publisher and the use units set by the publisher. The debiting information may also be affected by special privileges granted to the user. Having generated the debiting information, the process proceeds to step 344 wherein such information is displayed on the user's system's terminal to show the usage terms. In addition, the debiting information may be routed to an authority, or collection agency, and subsequently routed as crediting information to the appropriate publisher or publishers.

Figure 13:
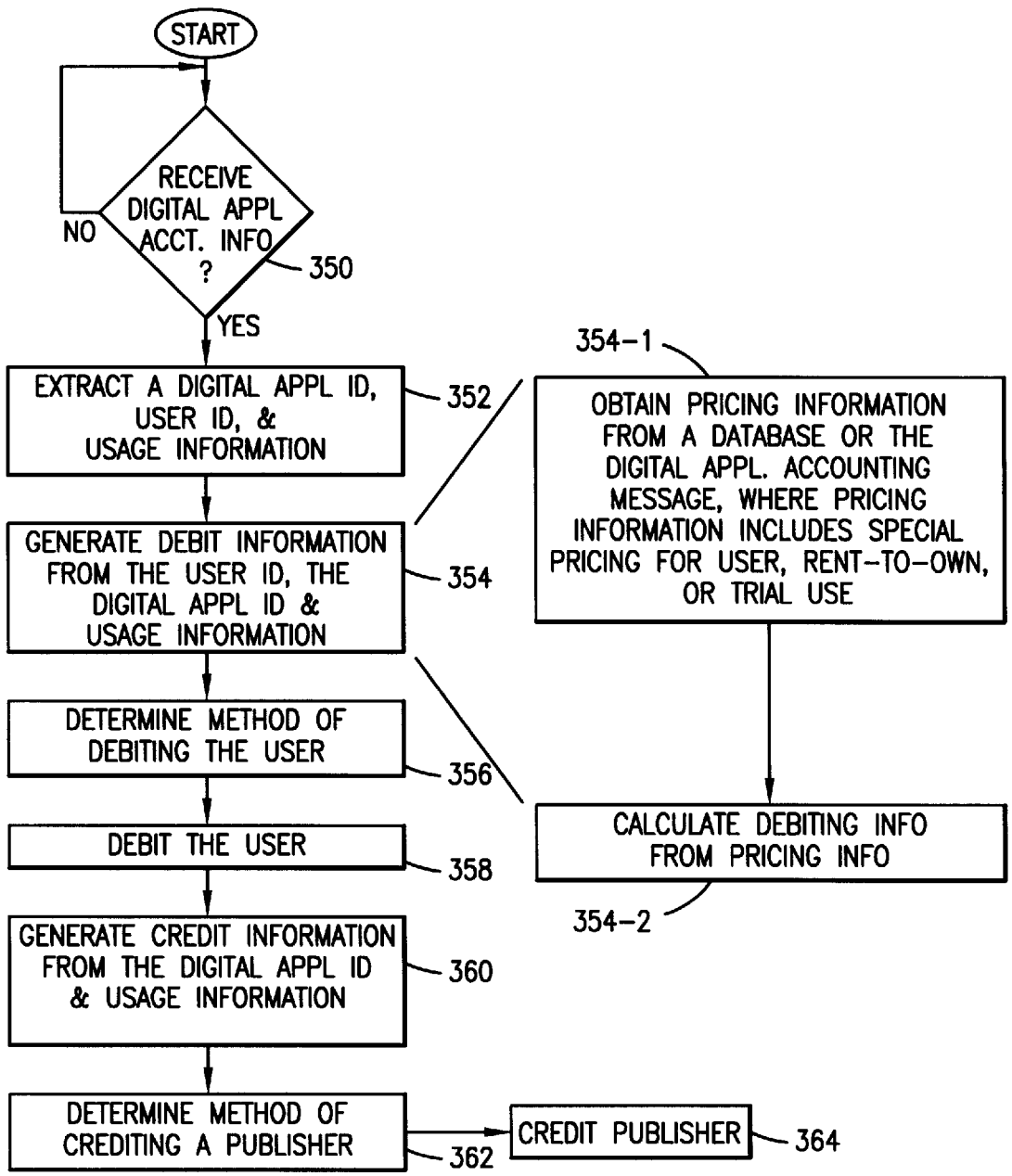
FIG. 13 illustrates a logic diagram that depicts an alternate method for generating debiting and credit information for users and publishers of digital applications.

FIG. 13 illustrates a logic diagram that may be used by a collection agency to provide crediting and debiting information. A crediting agency may be a computer terminal that includes sufficient processing power and memory to store the user data files as shown in FIGS. 3 and 4 and also to store the algorithm of FIG. 13. In addition, the collection agency must also contain sufficient processing power to execute these steps for multiple users simultaneously. In addition, the collection agency must also contain access to a network such that it may receive the debiting information from a meter file or obtain and provide collection information to the particular publishers or their representatives.

The collection agency begins the process at step 350 by determining whether it has received a digital application account information message. Once the digital application account information message is received, the process proceeds to step 352 wherein the collection agency extracts a digital application identification code, a user identification code, and use information. Having extracted this information, the process proceeds to step 354 wherein the collection agency generates debit information from the extracted information. This is done by obtaining price information from the user database and determining the amount owed therefrom. Alternatively, the pricing information, along with rent to own or trial use information, may be included in the digital application accounting information. Regardless of how such information is obtained, the process proceeds to step 354-2 wherein the debiting information is calculated from the pricing information and the amount of use information. Refer to FIGS. 3 and 4 for examples of calculation of debiting information.

Having calculated the debiting information, the process proceeds to step 356 wherein the process determines the particular method of debiting the user. For example, the collection agency may debit the user by sending a debiting message to the particular user's computer wherein the user may pay by mail or charging to a credit card. Another method of debiting may be to debit an account at a financial institution for the particular user. As an example of this alternative, assume that the user has a bank account wherein the bank is affiliated with the computer network. The debiting information may be sent to the bank such that the information may be directly debited from the user's bank account. As yet another example of a method for debiting the user, the user may have established a user credit account with the collection agency such that for each use of an application, the collection agency debits the user's credit account.

Having determined the method of debiting, the process proceeds to step 358 wherein the user is actually debited. Having done this, the process proceeds to step 360 wherein the method generates credit information from the digital application identification and usage information. This is very similar to determining the debiting information in that the collection agency determines the user of the digital application, the publisher of the digital application, and any special pricing information. Having generated the credit information, the process proceeds to step 362 wherein a method of crediting a publisher is determined. A publisher may be credited in a similar manner as the user may be debited. For example, the publisher may be directly reimbursed from the collection agency via an electronic message to its computer system, may receive a check in the mail, may have a bank account credited, or may have a publisher credit account accruing the crediting information. Having determined the method for crediting the publisher, the process proceeds to step 364 wherein the publisher is actually credited.

Note that the collection agency may be affiliated with the overall network and receive the digital application accounting information via the Internet. Alternatively, the collection agency may be within a local area or wide area network utilized by a company or similar user. In this environment, the collection agency collects the information via a local area network such as Ethernet. As yet another alternative, a computer may be equipped with software to execute its entire accounting mechanism wherein an individual computer performs its own crediting and debiting of accounts. As one skilled in the art will readily appreciate, the collection agency may be distributed throughout the network in any one of the entities affiliated with the network.

Figure 14:
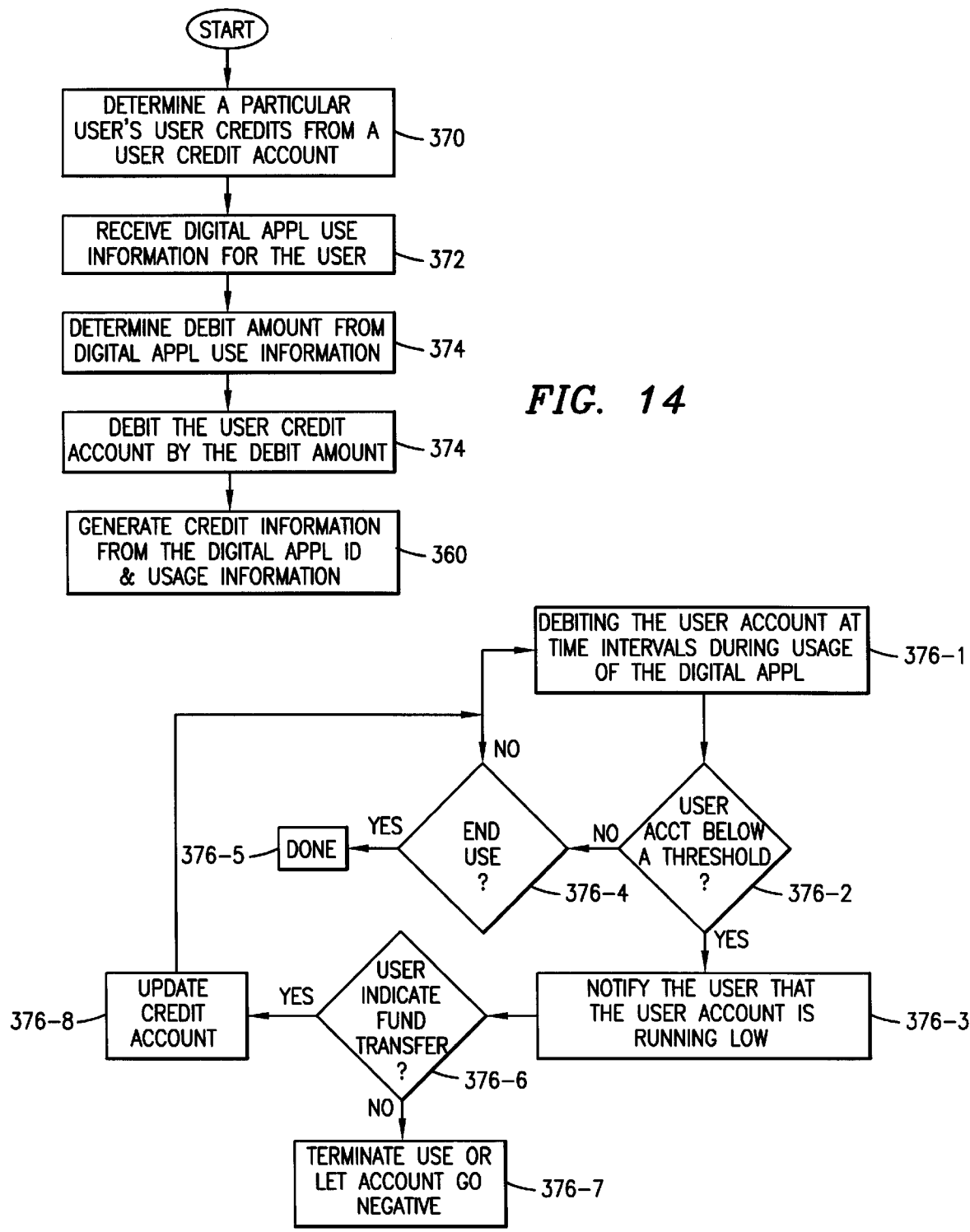
FIG. 14 illustrates a logic diagram that depicts a method for debiting a user credit account in accordance with the present invention.

FIG. 14 illustrates a logic diagram that illustrates an alternate method for a collection agency to generate debiting and crediting information. The process begins at step 370 wherein the collection agency determines whether a particular user has established a user's credit account and the amount of credit within that particular account. The user may establish a user credit account with a particular collection agency by prepaying monies into the user credit account. For example, the user credit accounts may be established for overall usage such that no matter which digital application for which publisher it uses, one account will be credited, or the account may be divided down by publishers such that the user can allocate funds for particular publishers. Regardless of how the user credit account is established, the process then proceeds to step 372 where it is determined whether a digital application use information message has been received from the user. As previously discussed, the digital application use information message will include a user identification code, amount of use, and a digital application identification code.

Having received the digital application use information message, the process proceeds to step 374 wherein the debiting amount is determined based on the application use information. Having determined the debiting amount, the process proceeds to step 376 wherein the user's credit account is debited by the debit amount. Note that the preceding process has been described with reference to accumulating the use information and upon completion of using the digital application, the digital application use information message is routed to the collection agency. This may result in the user account obtaining a negative balance. When such a condition occurs, the collection agency will send a notification message to the user indicating that such a condition has occurred and requesting procedures on how to remedy the situation.

As an alternative to a debiting process which does so at the completion of execution, the debiting process may be done on a continuing basis during execution. This is depicted at step 376-1 wherein the user account is debited at time intervals during usage of the digital application. The time intervals will correspond to the use units established by the publisher of the digital application. For example, if the publisher has established use units to be five minutes, the time intervals used for debiting will be five minutes or some multiple thereof.

During the continual debiting of the user account, the process checks the user account to determine whether it has fallen below a particular threshold. This is depicted at step 376-2. The particular threshold may be established to indicate that the user does not have enough funds to use the digital application until the next unit of use or some other threshold. In essence, the threshold may be arbitrarily set by the collection agency, the user, or the publisher. If the user account is not below the threshold, the process proceeds to step 376-4 where it determines whether the use of the digital application has ended. If not, the process proceeds to step 376-1. If, however, the use of the digital application has ended, the process proceeds to step 376-5 where use is terminated and a final accounting and debiting message is created for the particular user.

When the user account balance falls below the particular threshold, the process proceeds to step 376-3 wherein the user is notified that his/her account is running low. The process then proceeds to step 376-6 where the collection agency waits to determine whether it has received an indication from the user that funds should be transferred into the particular user credit account. The collection agency may establish a time response window for receiving an indication from the user. In addition, the funds may be transferred in any number of manners. For example, they may be transferred from one user credit account to another, from the user's financial institution, i.e., his/her bank account, or credit card number, or billed to the particular user.

If the user has not indicated a funds transfer within the time allotted, the process proceeds to step 376-7 wherein termination of the use of the digital application is activated and a final accounting message is generated. As an alternative, the collection agency may allow the user to accumulate a negative balance wherein the balance can be made up as described above. If, however, the user indicates a fund transfer, the process proceeds to step 376-8 wherein the user credit account is updated based on the amount of funds indicated, and the process repeats at step 376-1.

Figure 15:
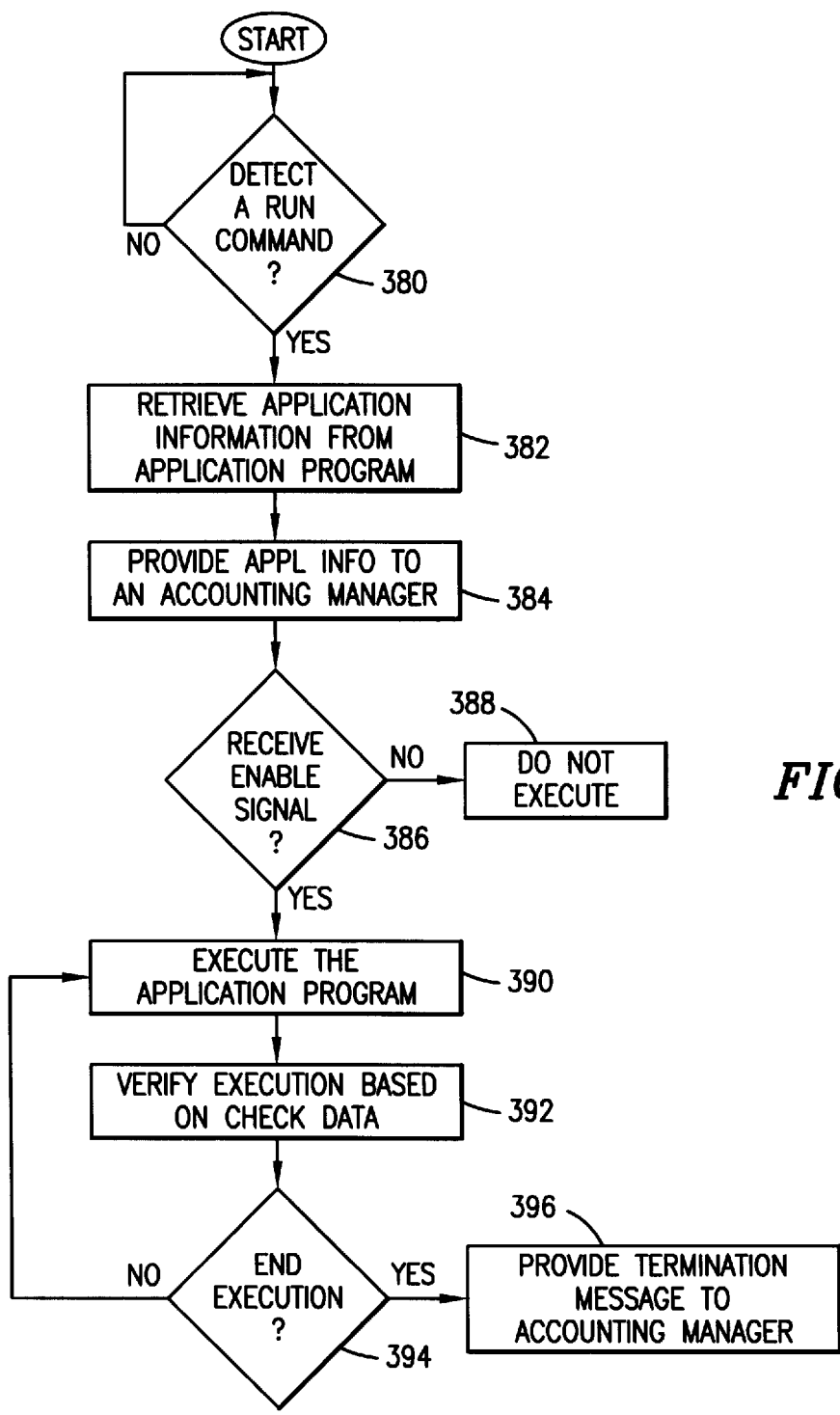
FIG. 15 illustrates a logic diagram that depicts a method for utilizing a digital application in accordance with the present invention.

FIG. 15 illustrates a logic diagram that indicates steps which are embedded in a digital application in accordance with the present invention. At step 380, the process determines whether a run command has been detected. Once a run command has been detected, the process proceeds to step 382 wherein application information is retrieved from the digital application program. As mentioned, the application information, which may be stored in a tariff file, includes the digital application identification code, a publisher identification code, and may also include an encryption key. Having retrieved this information, the process proceeds to step 384 wherein the application information is provided to an accounting manager. For the purposes of this process, the accounting manager may be a meter module affiliated with a computer executing the particular digital application, a television operating the particular application, a computer having embedded within it the functionality of a meter module, the collection agency which has the meter module functionality within it, or a publisher with the meter module functionality embedded within it.

Having provided the application information to the accounting manager, the process proceeds to step 386 where it determines whether it has received an enable signal. If an enable signal is not received, the process proceeds to step 388 where the execution of the digital application is prevented. If, however, an enable signal is received, the process proceeds to step 390 wherein the digital application program is executed. During the execution of the digital application, the process, at step 392, verifies its execution. This can be done in a number of methods. For example, the digital application identification code, the access control key, and a random number can be retrieved from the tariff file and sent to the meter module. The random number may be encrypted although it is not necessary. The co-processor of the meter module compares the random number it receives with a known value. If the known value does not match the random number value, it is determined that the execution of the digital application is not performing as intended.

Another example for verifying execution of the digital application may be to include a jump address table within the tariff file. Upon activation, the jump address table is sent to the meter module. The meter module utilizes the jump address table to return appropriate jump addresses. If the jump addresses do not match the anticipated jump addresses, the execution of the digital application is not verified. Yet another example of a verification process includes transmitting the access control key, a range of acceptable response times, and a random number to the meter module. The range of acceptable times is represented by a lower and upper limit. The meter module checks to determine whether the time of the next message is received within the limits. If not, the meter module indicates that the digital application is not being executed as desired.

While verifying the execution, the process continually checks at step 394 to determine whether the execution of the digital application has been terminated. If not, the process continues at step 390. If the execution has been terminated, the process proceeds to step 396 wherein a termination message is generated and sent to the accounting manager. The accounting manager then routes it to the collection agency such that the debiting information is halted upon termination of the execution. Note that for any of the various methods for the verification of the execution, if any of those fail, the execution of the digital application will be terminated, and the termination message will be generated as in step 396.

Figure 16:
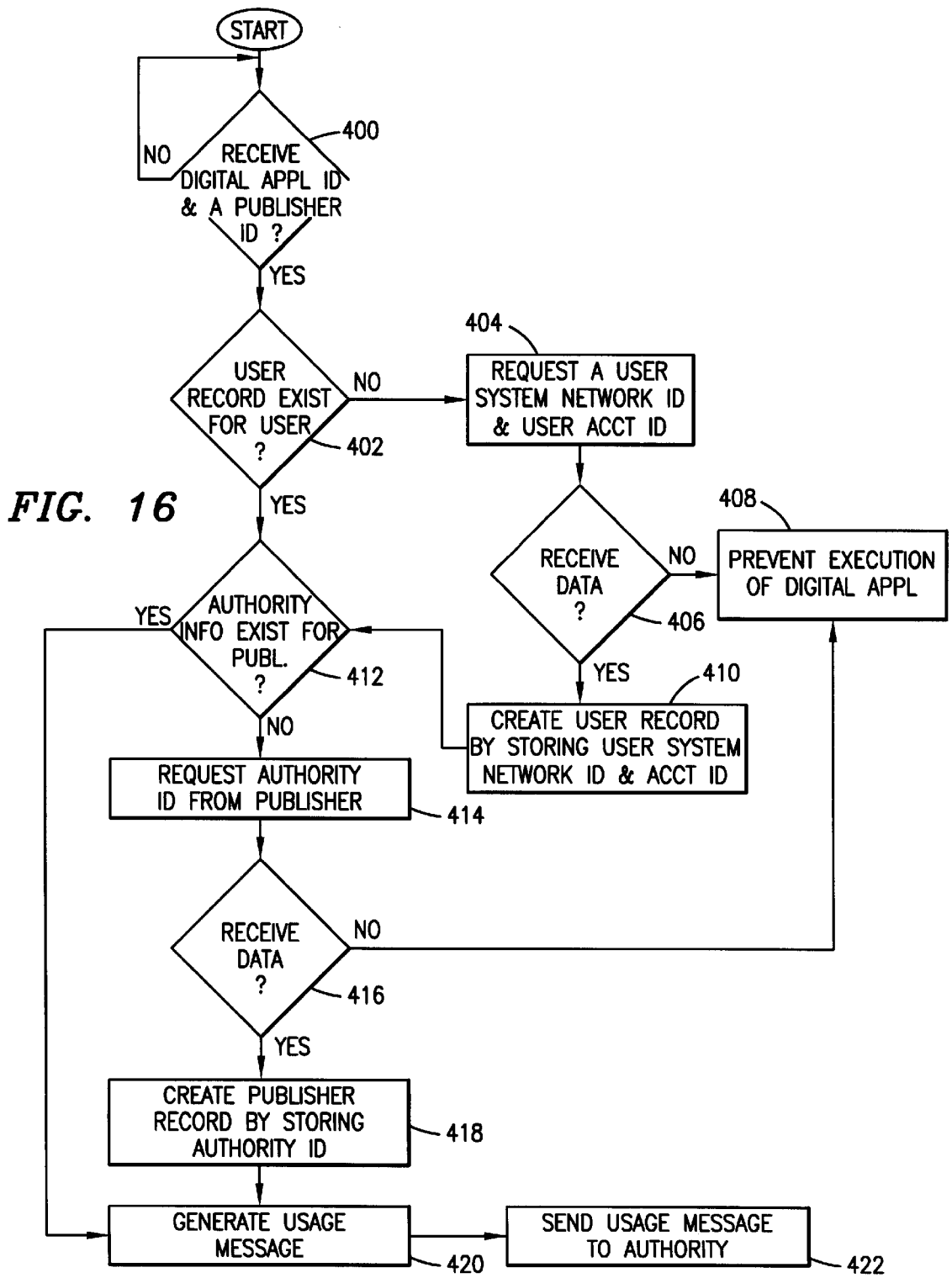
FIG. 16 illustrates a logic diagram for generating a meter data file in accordance with the present invention.

FIG. 16 illustrates a logic diagram that may be used by the meter module to generate a meter data file for a particular user and/or a particular digital application and publisher. The process begins at step 400 wherein the meter module determines whether it has received a digital application identification code and a publisher identification code. As previously discussed, this information will be received by the meter module when a user system activates use of a particular digital application. Once the information is received, the process proceeds to step 402 wherein it determines whether a user record exists for this particular user with respect to the digital application. If not, the process proceeds to step 404 wherein the process requests from the user a user system network ID and a user account ID. The user system network ID may be the user's Internet identification number, the user's electronic mail address, or any other addressing representation that allows a particular user to be identified within a network. The information may also include the user account identification which indicates how the user intends to pay for usage of the digital application. This has been previously discussed; thus, no further discussion will be presented regarding debiting a user's credit account.

Having requested the information, the process proceeds to step 406 where it determines whether it has received the requested data. Typically, the process will establish a response time wherein if the information is not received within the response time, the process will proceed to step 408. At step 408, the process prevents execution of the digital application. If, however, the data is received within the response time, the process proceeds to step 410 wherein the process creates a user record by storing the user system ID, network ID, and the user account ID.

Having located the user record, or created the user record, the process proceeds to step 412 where it determines whether an authority exists for the particular publisher identified by the publisher identification code. If not, the process proceeds to step 414 wherein the process requests an authority identification code from the publisher. Having requested the information, the process waits to determine whether the data is received within a response time. If not, the process proceeds to step 408 and prevents execution of the digital application. If, however, the information is received, the process proceeds to step 418 wherein the process creates a publisher record by storing the authority identification code. Having done this, the process proceeds to step 420 where it generates a usage message and subsequently sends that message to the authority at step 422.

The method of FIG. 16 allows a user to obtain a copy of a digital application, for example, software application, load it on to his/her computer, and begin running it. If the user is not recognized by the meter module, its initiation of the software application prompts the meter module to create a record for this particular user related to this particular digital application. In this regard, the control of the user database is not centralized, as it is in prior art systems. In prior art systems, the publisher, or software distributor, would control entering data into the user database. If, in the prior art system, a user was not entered into a database, the user could not access such information. Thus, the present invention provides the user the ability to obtain a copy of a software application and, by attempting to use the software, have itself entered into the user database.

In addition to creating entries in the user database upon activation by the user, the above process also detects whether this particular software application is being distributed by a proper authority. This is accomplished when the process requests an authority identification code from a particular publisher. If the publisher does not respond for a particular digital application, the process assumes that this publisher is not authorized to distribute that copy. It also prevents a digital application from being used without some publisher being credited for that use such that appropriate publishers are compensated for the use of their products.

Figure 17:
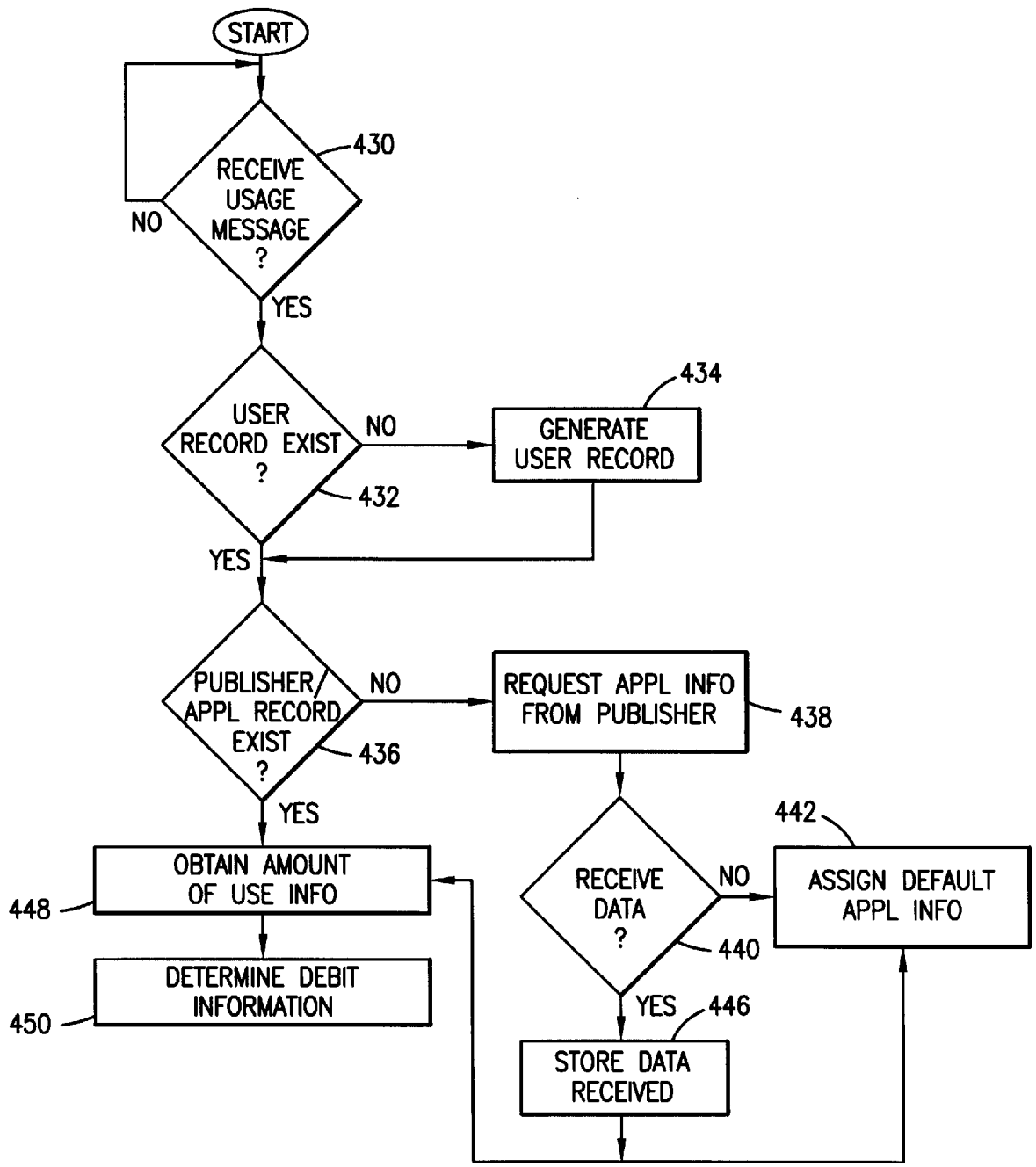
FIG. 17 illustrates a logic diagram for generating user information in accordance with the present invention.

FIG. 17 illustrates a logic diagram that may be used by a collection agency, or one of the other entities within the network shown in FIG. 1, to generate the user databases shown in FIGS. 3 and 4. The process begins at step 430 where it determines whether a usage message has been received. Having received the usage message, the process proceeds to step 432 wherein the process determines whether a record exists for the particular user identified in the user message. If not, the process generates a user record. As mentioned with reference to FIGS. 3 and 4, the user record will include the digital application identification code, pricing information, special privileges, etc.

Having located the file or generated the user record, the process proceeds to step 436 where it determines whether a publisher application record exists. The publisher application record is in a sense a portion of the user databases shown in FIGS. 3 and 4. The publisher application record indicates pricing information for a particular digital application and any special privileges associated therewith. In addition, the publisher application record also includes the default privileges previously discussed. If such information is not available, the process proceeds to step 438 wherein the process requests such information from the publisher.

The process then proceeds to step 440 where it determines whether it has received the requested information from a publisher. If not, the process assigns default application information to the user record at step 442. If the data is received, the process proceeds to step 446 wherein the received data is stored. Once all the needed information has been acquired, the process proceeds to step 448 wherein the amount of use information is obtained. Having obtained this information, the process proceeds to step 450 where debiting information is determined.

Figure 18:
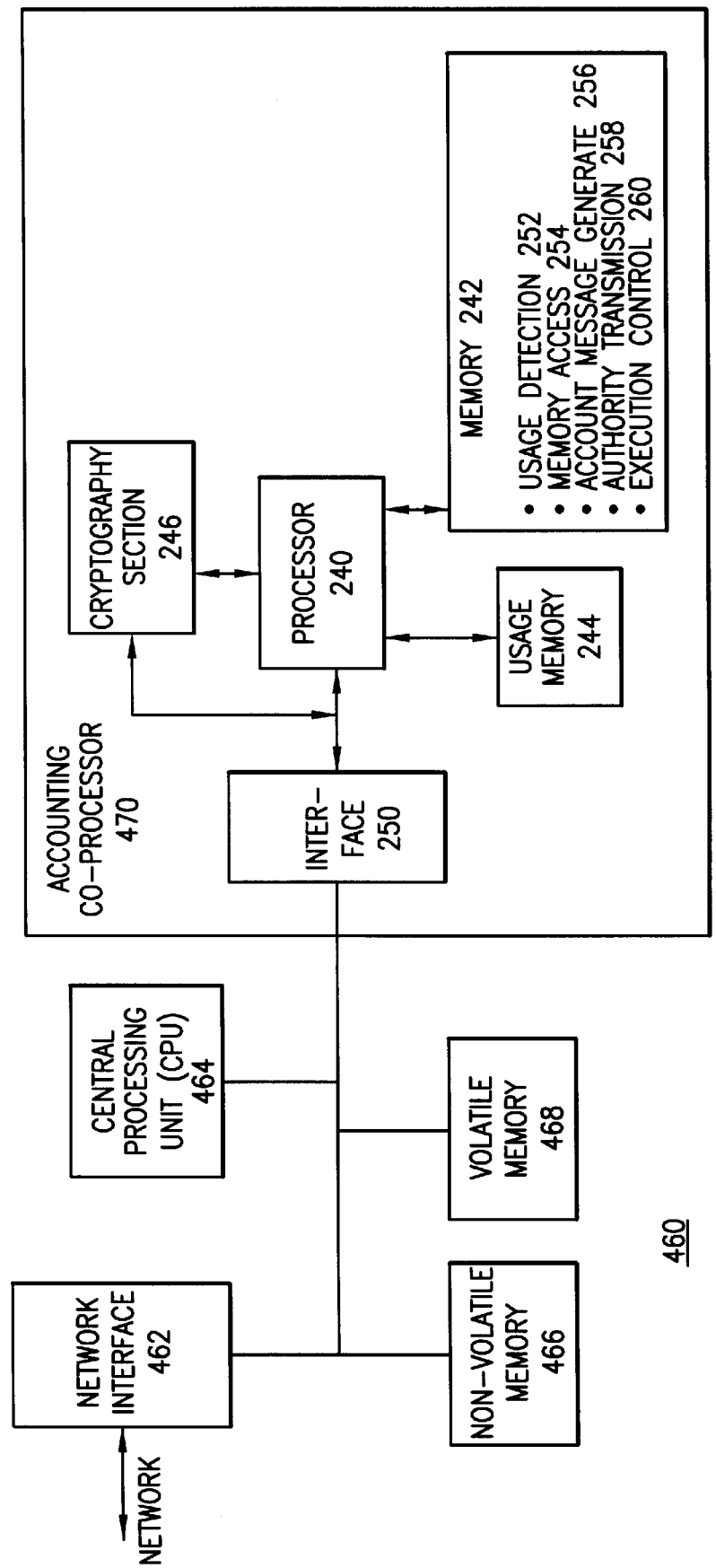
FIG. 18 illustrates a schematic block diagram of a computer that includes an accounting co-processor in accordance with the present invention.

FIG. 18 illustrates a computer 460 that includes the elements of computer 28 and also includes an accounting co-processor 470, which is similar to the meter module 26. As shown, the computer 460 includes a network interface 462, a central processing unit 464, volatile memory 468, and non-volatile memory 466. The central processing unit 464 may be any type of processor that performs operational instructions such as a microprocessor, microcontroller, or digital signal processor. The non-volatile memory 466 may be read-only memory (ROM) that stores operating system information and other information that the computer utilizes which needs to be permanently stored. The volatile memory 468, which may be random access memory (RAM), is used for storing data and program instructions that the central processing unit 466 is currently utilizing. The network interface 462 provides an interface to a network. These elements are generally known within the art; thus, no further discussion will be presented.

The accounting co-processor 470 includes a processor 240, a cryptography section 246, interface 250, usage memory 244, and memory 242. The accounting co-processor 470 has the same elements as depicted in FIG. 6 of the meter module 26. Thus, no further discussion will be presented regarding these elements.

FIG. 19 illustrates an alternative computer 480 that incorporates the teachings of the present invention. As shown, the computer includes a network interface 462, a central processing unit 464, volatile memory 468, and non-volatile memory 482. The non-volatile memory 482 is shown to include usage detection programming instructions 484, digital application identification programming instructions 486, usage information retrieval instructions 488, accounting message generation programming instructions 490, and authority transmission programming instructions 492. These programming instructions have been previously described with reference to FIGS. 7–11. In essence, the computer 480 of FIG. 19 includes the functionality of the meter module within its operating system.

What is claimed is:

1. A method for generating accounting data for use of a digital application in a communication network, the method comprising the steps of:

a) determining usage of the digital application by a user system;

b) retrieving a digital application identification code and publisher identification code which are affiliated with the digital application;

c) retrieving usage identification information from a meter data file that is associated with the user system when the meter data file is located; and d) generating an accounting message from the usage identification information, the digital application identification code, the publisher identification code, ant the usage, wherein the accounting message identifies the user, the digital application, and an authority.

2. The method of claim 1 further comprises the step of sending the accounting message to the authority, when the user system is affiliated with the communication network.

3. The method of claim 1, wherein step (d) further comprises authenticating activation of the digital application.

4. The method of claim 1, wherein step (a) further comprises determining activation of a telecommunication program, a software program, or a multi-media program as activation of the digital application, wherein the multi-media program includes at least one of an audio file, a video file, a text file, or a graphics file.

5. The method of claim 1, wherein the determining of activation of step (a) further comprises detecting a request from the user for the digital application.

6. The method of claim 1, wherein the authentication of activation of step (d) further comprises verifying that the user has access privileges to the digital application.

7. The method of claim 6 further comprises receiving an acknowledgement response from the user system.

8. The method of claim 6, wherein the verifying the user's access privileges further comprises accessing a privilege file that includes fields for digital application identification codes, digital application publishers, leasing or own, and discount information.

9. The method of claim 6, wherein the verifying the user's access privileges further comprises accessing a trial use file that includes fields for digital application identification codes, digital application publishers, trial use privileges, and number of trial uses.

10. The method of claim 6, wherein the verifying the user's access privileges further comprises accessing a benefit file that includes fields for identifying special benefits granted to the user such as special rates and special access privileges to nonpublic digital application.

11. The method of claim 1, wherein step (b) further comprises accessing a tariff file within the digital application to obtain the digital application identification code and the publisher identification code.

12. The method of claim 11, wherein step (b) further comprises retrieving, from the tariff file, at least one of an access control key, an encryption key, use interval, service pricing schedule, or size of free memory from the tariff file.

13. The method of claim 11, wherein the authentication of activation in step (d) further comprises executing a verification routine to detect inconsistencies in the tariff file.

14. The method of claim 11, wherein step (b) further comprises decrypting the tariff file to obtain the digital application identification code and the publisher identification code.

15. The method of claim 1, wherein step (c) further comprises preventing execution of the digital application when the meter data file cannot be located.

16. The method of claim 1, wherein step (b) further comprises retrieving at least one of a serial number of the digital application, pricing information, or authority identification code.

17. The method of claim 1, wherein step (c) further comprises retrieving at least one of a user identification code, an authority identification code, a usage identification code, or a meter data file identification code.

18. The method of claim 1, wherein step (d) further comprises generating the accounting message to identify amount of use and amount owed.

19. The method of claim 18, wherein step (d) further comprises generating a portion of the account message from a payment file that includes fields for digital application identification codes, publisher identification codes, pricing information, the amount of use, and the amount owed.

20. The method of claim 18, wherein steps (d) and (e) further comprises compiling the accounting message to generate an accounting history message and sending the accounting history message as the accounting message.

21. The method of claim 1, wherein step (e) further comprises determining a transmission path from a plurality of transmission paths to send the accounting message to the authority.

22. The method of claim 1, wherein steps (d) and (e) further comprise generating the accounting message to identify at least two authorities and sending relevant portions of the accounting message to each of the at least two authorities.

23. The method of claim 1, wherein step (d) further comprises identifying the authority to be at least one of the publisher or a collection agency.

24. The method of claim 1 further comprises verifying, during execution of the digital application, operation of the digital application based on check data embedded in multiple locations within the digital application.

25. The method of claim 24 further comprises decrypting the digital information to enable the execution of the digital information.

26. The method of claim 1 further comprises sending at least a portion of the accounting message to the user when a user accounting message is received.

27. The method of claim 1, wherein step (e) further comprises encoding at least the identity of the user within the accounting message so that the user has anonymity.

28. A method for generating usage accounting information of digital applications regardless of distribution channels, the method comprising the steps of:
  a) detecting usage of a digital application by a user system;
  b) obtaining a digital application identification code and a publisher identification code from the digital application;
  c) obtaining a user identification code from a meter data file affiliated with the user system, when the meter data file is located; and
  d) generating debiting information for the user system based on the usage of the digital application, where the debiting information includes the user identification code, the digital application identification code, the publisher identification code, and an amount of usage, such that when the digital application is used, regardless of how it was obtained, appropriate digital application suppliers can be compensated.

29. The method of claim 28, wherein step (c) further comprises obtaining an authority identification code from the meter data file, and step (d) further comprises transmitting the debiting information to an authority identified by the authority identification code when the user system is operably coupled to a communication network.

30. The method of claim 28, wherein step (c) further comprises, when the meter data file is not located,
  requesting the user identification code from the user system; and
  creating the meter data file when the user identification code includes a network address.

31. The method of claim 30 further comprises:

initiating a display on the user system, wherein the display includes notification of usage terms, a request for the user identification code, and a request to continue processing.

32. The method of claim 28 further comprises, when the meter data file is not located, inhibiting usage of the digital application.

33. A computer readable memory tangibly embodying a program of instructions for directing a computer to perform digital information accounting, said program of instructions comprising:

determination means for causing the computer to detect when digital information is activated by a user system;

first retrieve means for causing the computer to retrieve a digital information code and a publisher identification code after activation of the digital information has been detected;

second retrieve means for causing the computer to retrieve usage information from a meter data file affiliated with the computer when the meter data file is located by the computer;

generation means for causing the computer to generate an accounting message from the usage information, the digital information identification code and the publisher identification code when activation has been authenticated; and sending means for causing the computer to send the accounting message to an authority identified in the accounting message.

34. The computer readable memory of claim 33, wherein the generation means further comprises verification means for causing the computer to verify that the user system has access privileges to the digital information.

35. The computer readable memory of claim 33 further comprises execution means for causing the computer to enable the digital information such that the user system may execute the digital information.

36. A computer readable memory tangibly embodying a program of instructions that direct a computer to generate usage accounting information of a digital application regardless of distribution channels, said program of instructions comprising:

detecting means for causing the computer to detect usage of a digital application by a user system;

first obtaining means for causing the computer to obtain a digital application identification code and a publisher identification code from the digital application;

second obtaining means for causing the computer to obtain an user identification code from a meter data file that is affiliated with the user system when the meter data file is located; and generation means for causing the computer to generate debiting information for the user system based on the usage of the digital information.

37. The computer readable memory of claim 36, wherein the second obtaining means further comprises means for causing the computer to obtain an authority identification code from the meter data file, and the generation means further comprises means for causing the computer to transmit the debiting information to an authority identified by the authority identification code when the user system is operably coupled to a communication network.

38. The computer readable memory of claim 36, wherein the second obtaining storage means further comprises, when the meter data file is not located, means for causing the computer to request the user identification code from the user system; and means for causing the computer to create the meter data file when the user identification code includes a network address.

39. The computer readable memory of claim 38 further comprises:

means for causing the computer to display notification of usage terms, a request for the user identification code, and a request to continue processing on the user system.

40. The computer readable memory of claim 36 further comprises means for causing the computer to inhibit usage of the digital application when the meter data file is not located.

41. An apparatus for generating accounting information of digital application usages, the apparatus comprising memory that stores usage detection program instructions, memory access program instructions, accounting message generation program instructions, and authority transmission program instructions;

usage memory that stores usage information; and processor that performs the usage detection program instructions to detect activation of a digital application, performs the memory access instructions to retrieve the usage information from the usage memory and to retrieve a digital application identification code and a publisher identification code from the digital application, performs the accounting message generation program instructions to generate a usage accounting message, and performs the authority transmission program instructions to transmit the usage account message to an authority.

42. The apparatus of claim 41 further comprises an interface that is operably coupled to the processor and to a computer supporting the digital application.

43. The apparatus of claim 41 further comprises a cryptography section operably coupled to the processor, the cryptography section decrypts the digital application identification code and the publisher identification code.

44. The apparatus of claim 41 further comprises a cryptography section operably coupled to the processor, the cryptography section, upon a command from the processor, decrpyts the digital application and upon a second command from the processor, encrypts the digital application.

45. The apparatus of claim 41, wherein the memory further stores execution control program instructions, wherein, when the execution control program instructions are performed by the processor, the processor verifies integrity of execution of the digital information.

46. The apparatus of claim 41, wherein the usage memory further comprises an accounting buffer, the accounting buffer stores pricing information and accumulated usage information.

47. The apparatus of claim 41, wherein the usage memory further comprises a payment file, the payment file stores a record of payment for the user system.

48. The apparatus of claim 41 further comprises being implemented on an integrated circuit.

49. The computer of claim 41, wherein the accounting co-processor further comprises a cryptography section operably coupled to the processor, the cryptography section decrypts the digital application identification code and the publisher identification code and, upon a command from the processor, decrpyts the digital application and, upon a second command from the processor, encrypts the digital application.

50. A method for utilizing digital application accounting information, the method comprising the steps of:
 a) receiving a digital application accounting information message;
 b) extracting a digital application identification code, a user identification code, and usage information from the digital application accounting information message; and
 c) generating debit information from the user identification code, the digital application identification code, and the usage information.

51. The method of claim 50, wherein step (a) further comprises receiving the digital application accounting information message via a network.

52. The method of claim 50, wherein step (c) further comprises obtaining price information to generate the debit information.

53. The method of claim 52 further comprises obtaining the price information by extracting the price information from the digital application identification code.

54. The method of claim 52 further comprises obtaining the price information by accessing a database.

55. The method of claim 52 further comprises obtaining special pricing information as part of the price information, where the special price information indicates at least one of a discount rate, rent-to-own information, or trial use.

56. The method of claim 50 further comprises determining method of payment to be one of a combination of debiting a user, debiting a user's financial account, or debiting a user's network account.

57. The method of claim 56 further comprises debiting, via the determined method of payment, a user that is identified by the usage information based on the debit information.

58. The method of claim 50 further comprises the step of generating credit information from the digital application identification code and the usage information.

59. The method of claim 58 further comprises the step of determining a method of credit to one of a combination of crediting a publisher, crediting a publisher's financial account, or crediting a publisher's network account.

60. The method of claim 59 further comprises the step of crediting, via the determined method of credit, a publisher identified by the digital application information based on the credit information.

61. The method of claim 50 further comprises updating a user-digital application use file to indicate most recent usage of the digital application by the user when a record exists for the user.

62. The method of claim 61 further comprises, when a user first uses a digital application, generating the record in the data base for the user.

63. A method for receiving payment of digital application usages, the method comprising the steps of:
 a) determining user credits for a particular user by reading a user credit account;
 b) receiving digital application use information for the particular user;
 c) determining a debit amount from the digital application use information; and
 d) debiting the user credit account by the debit amount.

64. The method of claim 63, wherein step (a) further comprises establishing the user credit account based on prepayment of the user credits.

65. The method of claim 63, wherein step (b) further comprises receiving a user identification code, amount of usage, and a digital application code as at least part of the digital application use information.

66. The method of claim 65, wherein step (c) further comprises determining the debit amount based on the digital application code, the amount of usage, and pricing information.

67. The method of claim 63, wherein step (d) further comprises debiting the user account, at timed intervals, during usage of the digital application.

68. The method of claim 67 further comprises notifying the particular user when the user account falls below a certain threshold.

69. The method of claim 68 further comprises transferring funds from a financial account of the particular user to the user account when prompted by the particular user.

70. A computer readable memory tangibly embodying a program of instructions for directing a computer to perform digital application payment, said program of instructions comprising:
 receiving means for causing the computer to receive a digital application accounting information message;
 extraction means for causing the computer to extract a digital application code, a user identification code, and usage information from the digital application accounting information message; and
 generation means for causing the computer to generate debit information from the user identification code, the digital application identification code, and the usage information.

71. The computer readable memory of claim 70, wherein the extraction means further comprises means for causing the computer to obtain pricing information either from the digital application identification code or a database.

72. The computer readable memory of claim 70 further comprises debiting means for causing the computer to debit a user identified by the user identification code the debit amount via a direct debit, debiting a financial account of the user, or debiting a network account of the user.

73. The computer readable memory of claim 70 further comprises credit generation means for causing the computer to generate credit information from the digital application identification code and the usage information.

74. The computer readable memory of claim 73, wherein the credit generation means further comprises means for causing the computer to credit a publisher identified in the digital application identification code via a direct credit, crediting a financial account of the publisher, or crediting a network account of the publisher.

75. The computer readable memory of claim 70 further comprises database means for causing the computer to update a user-digital application database.

76. A computer readable memory tangibly embodying a program of instructions that directs a computer to receive payment of digital application usages, said program of instructions comprising:
 means for causing the computer to maintain user credits for a particular user, thereby forming a user credit account;
 receiving means for causing the computer to receive digital application use information;
 determination means for causing the computer to determine a debit amount from the digital application use information; and
 debiting means for causing the computer to debit the user credit account by the debit amount.

77. The computer readable memory of claim 76 wherein the debiting means further comprises means for causing the computer to debit the user credit account at time intervals while the digital application is in use.

78. The computer readable memory of claim 77, wherein the debiting means further comprises means for causing the computer, when the user account is below a threshold, to display a message that queries the user as to whether the user wishes to continue using the digital application and, when the user responds to continue, as to how additional credits are to be added to the user credit account.

79. A computer readable memory tangibly embodying a program of instructions that directs a computer to perform an application and to retrieve usage information, said instructions comprising:

application means for causing the computer to perform the application; and information means for storing application information;

usage means for causing the computer to retrieve the application information and to send at least a portion of the application information to an accounting monitor; and execution means for causing the computer to enable execution of the application program instructions when the computer receives an enablement signal from the accounting monitor.

80. The computer readable memory of claimed 79, wherein the information means further functions to store at least one of application identification code, access control key, encryption key, charge interval, or pricing information as the application information.

81. The computer readable memory of claim 79 wherein the application means further comprises storing, throughout the application, check data and wherein the execution means further comprises verifying means for causing the computer to verify integrity of execution of the application based on the check data.

82. The computer readable memory of claim 81, wherein the verifying means further includes:

means for causing the computer to send a random number and at least a part of the application information to the accounting monitor and to receive a disable message from the accounting monitor when the random number does not match an anticipated value;

means for causing the computer to send a jump address table to the accounting monitor and to receive jump addresses from the accounting monitor; or means for causing the computer to send a range of response times and a random number to the accounting monitor and to receive the disable message when a next message is not received by the accounting monitor within the range of response times.

83. The computer readable memory of claim 79 further comprises termination means for causing the computer to send a termination message to the accounting monitor when execution of the application program instructions are terminated.

84. A method for providing application information to an accounting monitor, the method comprising the steps of:

a) detecting a run command to execute an application program;

b) retrieving the application information from the application program;

c) sending at least a portion of the application information to the accounting monitor; and d) executing the application program when an enablement signal is received from the accounting monitor.

85. The method of claim 84, wherein step (b) further comprises retrieving at least one of application identification code, access control key, encryption key, charge interval, or pricing information as the application information.

86. The method of claim 84 further comprises verifying integrity of execution of the application program based on check data, wherein the check data is stored throughout the application program.

87. The method of claim 86, wherein the step of verifying further comprises verify the execution of the application program by at least one of:

sending a random number and at least a part of the application information to the accounting monitor and receiving a disable message from the accounting monitor when the random number does not match an anticipated value;

sending a jump address table to the accounting monitor and receiving jump addresses from the accounting monitor; or sending a range of response times and a random number to the accounting monitor and receiving the disable message when a next message is not received by the accounting monitor within the range of response times.

88. The method of claim 84 further comprises sending a termination message to the accounting monitor when execution of the application program is terminated.

89. A computer readable memory tangibly embodying a program of instructions that directs a computer to end application information prior to execution of a program, the program of instructions comprising:

program means for causing the computer to perform the program; and application means for storing application information related to the program and for causing the computer to send at least a portion of the application information to an accounting monitor.

90. A computer that retrieves use accounting information for digital applications, the computer comprising:

a central processing unit;

non-volatile memory operably coupled to the central processing unit;

volatile memory operably coupled to the central processing unit; and accounting co-processor that is operably coupled to the central processing unit, the accounting co-processor includes:

memory that stores usage detection program instructions, memory access program instructions, accounting message generation program instructions, and authority transmission program instructions;

usage memory that stores usage information; and processor that performs the usage detection program instructions to detect activation of a digital application, performs the memory access instructions to retrieve the usage information from the storage memory and to retrieve a digital application identification code and a publisher identification code from the digital application, performs the accounting message generation program instructions to generate a usage accounting message, and performs the authority transmission program instructions to transmit the usage account message to an authority.

91. The computer of claim 90, wherein the accounting co-processor further comprises an interface that is operably coupled to the processor and to the central processing unit.

92. The computer of claim 90, wherein the memory further stores execution control program instructions, wherein, when the execution control program instructions are performed by the processor, the processor verifies integrity of execution of the digital information.

93. A computer that retrieves use accounting information for digital applications, the computer comprising:
a central processing unit;
non-volatile memory operably coupled to the central processing unit; and
volatile memory operably coupled to the central processing unit;
wherein the non-volatile memory includes:
determination storage means for storing program instructions that cause the central processing unit to detect when a digital application is activated;
first retrieve storage means for storing program instructions that cause the central processing unit to retrieve a digital application identification code and a publisher identification code after activation of the digital application has been detected;
second retrieve storage means for storing program instructions that cause the central processing unit to retrieve usage information from a meter data file affiliated with the computer;
generation storage means for storing program instructions that cause the central processing unit to generate an accounting message from the usage information, the digital application identification code and the publisher identification code when activation has been authenticated; and
sending storage means for storing program instructions that cause the central processing unit to send the accounting message to an authority identified in the accounting message.

94. A method for generating user meter files for tracking digital application usage, the method comprising the steps of:
a) receiving a digital application identification code and a publisher identification code from a user system, the receiving indicates initialization of the digital application by the user system;
b) determining whether a user record exists for the user system;
c) when the user record does not exist, requesting a user system network identification code and a user account identification code from the user system; and
d) storing the user system network identification code and the user account identification code as the user record in a user database.

95. The method of claim 94 further comprises the steps of:
e) determining whether authority information exists for a publisher identified by the publisher identification code;
f) when the authority information does not exist, requesting an authority identification code from the publisher; and
g) storing the authority identification code in a publisher database when the authority identification code is received.

96. The method of claim 95 further comprises the step of:
h) generating a usage message to include the user account identification code, the digital information identification code, and the authority identification code.

97. The method of claim 96, wherein step (h) further comprises generating the usage message to include the publisher identification code.

98. The method of claim 96 further comprises sending the usage message to an authority identified by the authority identification code.

99. The method of claim 96, wherein step (h) further comprises generating the usage message to include amount of use.

100. The method of claim 94 further comprises, when the user system network identification code or the user account identification code is not received, preventing execution of the digital application.

101. A method for generating user account files for tracking digital application usage, the method comprising the steps of:
a) receiving a usage message that includes a digital application identification code, a publisher identification code, and a user account identification code;
b) determining whether a user record exists for a user identified by the user account identification code; and
c) when the user record does not exist, generating the user record to identify the user account identification code, the publisher identification code and the digital application identification code.

102. The method of claim 101, wherein step (c) further comprises determining the debit information by:
retrieving a publisher/application record to determine pricing information when the publisher/application record exists;
obtaining amount of use information; and
determining the debit information based on the pricing information and the amount of use information.

103. The method of claim 102 further comprises the steps of:
when the publisher/application record does not exist, requesting application information for a digital application identified by the digital application identification code from a publisher identified by the publisher identification code; and when the digital application information is obtained, storing, with respect to the user, the application information as publisher/application record.

104. The method of claim 103, wherein the storing the application information further comprising storing, as the application information, at least one of trial use information, rent-to-own information, discount pricing information, and special privilege information.

105. The method of claim 101, wherein step (a) further comprises obtaining credit account information from the user account identification code, and wherein step (c) further comprising debiting the debit information from the credit account information.

106. A computer readable memory tangibly embodying a program of instructions for directing a computer to generate user meter files, the program of instructions comprising:
receive means for causing the computer to receive digital application information and a publisher identification code which indicate initialization of a digital application by a user system;
determine means for causing the computer to determine whether a user record exists in a user data base;
request means for causing the computer to request a user system network identification code and a user account identification code from the user system when the user record does not exist; and
store means for causing the computer to store the user system network identification code and the user account identification code as the user record in the user data base.

107. The computer readable memory of claim 106 further comprising: means for causing the computer to determine whether authority information exists for a publisher identified by the publisher identification code;

means for causing the computer to request an authority identification code from the publisher when the authority information does not exist; and means for causing the computer to store the authority identification code in a publisher data base.

108. A computer readable memory tangibly embodying a program of instructions for directing a computer to generate user account files, said program of instructions comprising:

receive means for causing the computer to receive a usage message, the usage message includes a digital application identification code, a publisher identification code, and a user account identification code;

determine means for causing the computer to determine whether a user record exists for a user identified by the user account identification code; and generate means for causing the computer to generate the user record to identify the user account identification code, the publisher identification code, the digital application code, and debit information when the user record does not exist.

109. The computer readable memory of claim 108 further comprising:

means for causing the computer to retrieve pricing information from a publisher/application record when the publisher/application record exists;

means for causing the computer to obtain amount of use information; and means for causing the computer to determine the debit information based on the pricing information and the amount of use information.

110. The computer readable memory of claim 109 further comprising:

means for causing the computer to request application information for a digital application identified by the digital application identification code from a publisher identified by the publisher identification code when the publisher/application record does not exist; and means for causing the computer to store the application information with respect to the user record when the application information is obtained.

* * * * *

UNITED STATES PATENT AND TRADEMARK OFFICE
CERTIFICATE OF CORRECTION

PATENT NO. : 5,825,883
DATED : October 20, 1998
INVENTOR(S) : William C. Archibald, et al.

It is certified that error appears in the above-identified patent and that said Letters Patent is hereby corrected as shown below:

column 27, line 26, "claimed" should be --claim--;

column 28, line 27, "end" should be --send--;

Signed and Sealed this

Twenty-sixth Day of January, 1999

Attest:

Attesting Officer

Acting Commissioner of Patents and Trademarks